(12) United States Patent
Setayesh et al.

(10) Patent No.: US 10,073,837 B2
(45) Date of Patent: Sep. 11, 2018

(54) METHOD AND SYSTEM FOR IMPLEMENTING ALERTS IN SEMANTIC ANALYSIS TECHNOLOGY

(71) Applicant: ORACLE INTERNATIONAL CORPORATION, Redwood Shores, CA (US)

(72) Inventors: Mehrshad Setayesh, Lafayette, CO (US); Marta Lynn Studinger, Centennial, CO (US); Sonal Bablani, Broomfield, CO (US); Laxmi Narsimha Rao Oruganti, Telengana (IN); Mukesh Jha, Telengana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 260 days.

(21) Appl. No.: 14/815,714

(22) Filed: Jul. 31, 2015

(65) Prior Publication Data
US 2016/0034571 A1  Feb. 4, 2016

Related U.S. Application Data

(60) Provisional application No. 62/031,771, filed on Jul. 31, 2014.

(51) Int. Cl.
| | | |
|---|---|---|
| *G06F 17/30* | (2006.01) | |
| *G06F 17/27* | (2006.01) | |
| *G06F 9/54* | (2006.01) | |
| *G06F 17/24* | (2006.01) | |
| *H04L 12/26* | (2006.01) | |
| *H04L 12/58* | (2006.01) | |

(52) U.S. Cl.
CPC .......... *G06F 17/2785* (2013.01); *G06F 9/542* (2013.01); *G06F 17/241* (2013.01); *G06F 17/30707* (2013.01); *H04L 43/16* (2013.01); *H04L 51/14* (2013.01); *H04L 51/32* (2013.01)

(58) Field of Classification Search
CPC ......... G06F 17/30707; G06F 17/30315; G06F 17/30
USPC ................................................ 707/600–899
See application file for complete search history.

(56) References Cited

U.S. PATENT DOCUMENTS

| | | |
|---|---|---|
| 5,946,386 A | 8/1999 | Rogers et al. |
| 7,289,949 B2 | 10/2007 | Warner et al. |
| 7,383,172 B1 | 6/2008 | Jamieson |
| 8,090,724 B1 | 1/2012 | Welch |
| 8,245,135 B2 | 8/2012 | Cai |

(Continued)

OTHER PUBLICATIONS

Final Office Action dated May 20, 2016 for related U.S. Appl. No. 14/527,697.

(Continued)

*Primary Examiner* — Isaac M Woo
(74) *Attorney, Agent, or Firm* — Invoke

(57) ABSTRACT

Disclosed is an approach for allowing an entity to perform semantic analysis upon data associated with an entity, and to automatically perform categorization of that data and to generate alerts based on a set of predefined rules. A topic is created based on which to categorize a set of semantically analyzed messages. A set of rules is defined, wherein an alert is generated when the set of rules is satisfied for the semantically analyzed messages.

26 Claims, 25 Drawing Sheets

(56) References Cited

U.S. PATENT DOCUMENTS

| | | |
|---|---|---|
| 8,762,302 B1 | 6/2014 | Spivack et al. |
| 8,812,752 B1 | 8/2014 | Shih et al. |
| 8,954,440 B1 | 2/2015 | Gattani et al. |
| 2002/0116174 A1 | 8/2002 | Lee et al. |
| 2003/0061200 A1 | 3/2003 | Hubert |
| 2003/0154072 A1 | 8/2003 | Young et al. |
| 2004/0162827 A1 | 8/2004 | Nakano |
| 2004/0205448 A1 | 10/2004 | Grefenstette |
| 2004/0225667 A1 | 11/2004 | Hu |
| 2005/0108001 A1 | 5/2005 | Aarskog |
| 2006/0069589 A1 | 3/2006 | Nigam et al. |
| 2006/0153345 A1 | 7/2006 | Bushey et al. |
| 2007/0067157 A1 | 3/2007 | Kaku |
| 2008/0133488 A1 | 6/2008 | Bandaru et al. |
| 2009/0112892 A1 | 4/2009 | Cardie |
| 2009/0177484 A1 | 7/2009 | Davis et al. |
| 2009/0271324 A1 | 10/2009 | Jandhyala et al. |
| 2009/0285384 A1 | 11/2009 | Pollock et al. |
| 2010/0125540 A1 | 5/2010 | Stefik et al. |
| 2010/0280985 A1* | 11/2010 | Duchon ............ G06N 7/005 706/52 |
| 2010/0312769 A1 | 12/2010 | Bailey et al. |
| 2011/0153595 A1 | 6/2011 | Bernstein et al. |
| 2011/0196670 A1 | 8/2011 | Dang |
| 2012/0089621 A1 | 4/2012 | Liu et al. |
| 2012/0131139 A1 | 5/2012 | Siripurapu et al. |
| 2012/0303559 A1 | 11/2012 | Dolan |
| 2013/0081056 A1 | 3/2013 | Hu et al. |
| 2013/0238785 A1 | 9/2013 | Hawk et al. |
| 2013/0262442 A1 | 10/2013 | Dennis |
| 2013/0336310 A1 | 12/2013 | Laasik et al. |
| 2014/0074551 A1 | 3/2014 | Setayesh et al. |
| 2014/0189114 A1 | 7/2014 | Richardson |
| 2014/0215443 A1 | 7/2014 | Voccio et al. |
| 2015/0089409 A1 | 3/2015 | Asseily |
| 2015/0120302 A1 | 4/2015 | Mccandless et al. |
| 2015/0149448 A1 | 5/2015 | Mccandless et al. |
| 2015/0149463 A1 | 5/2015 | Mccandless et al. |
| 2015/0195406 A1 | 7/2015 | Dwyer et al. |
| 2016/0034445 A1 | 2/2016 | Setayesh et al. |
| 2016/0034560 A1 | 2/2016 | Setayesh et al. |
| 2016/0092551 A1 | 3/2016 | Tang et al. |

OTHER PUBLICATIONS

Notice of Allowance and Fee(s) Due dated Oct. 12, 2016 for related U.S. Appl. No. 14/527,697.

Non-final Office Action dated Dec. 3, 2015 for related U.S. Appl. No. 14/527,697.

Liyang, Tang, et al. "A conceptual framework for business intelligence as a service (saas bi)." Intelligent Computation Technology and Automation (ICICTA), 2011 International Conference on. vol. 2. IEEE, 2011.

Memory Recall/retrieval—Memory processes—The Human memory, http://www.lukemastin.com/humanmemory/processes_recall.html, Mar. 6, 2018.

Adult Survivors of Childhood Trauma and Recovered Memories, http://www.istss.org/public-resources/remembering-childhood-trauma.aspx, Mar. 5, 2018.

\* cited by examiner

METHOD AND SYSTEM FOR IMPLEMENTING ALERTS IN SEMANTIC ANALYSIS TECHNOLOGY

CROSS-REFERENCE TO RELATED APPLICATION(S)

This application claims priority to U.S. Provisional Patent Application Ser. No. 62/031,771 filed on Jul. 31, 2014 entitled "METHOD AND SYSTEM FOR IMPLEMENTING SEMANTIC TECHNOLOGY." This application is a cross-related to U.S. patent application Ser. No. 14/815,692 filed concurrently entitled "METHOD AND SYSTEM FOR IMPLEMENTING SEMANTIC TECHNOLOGY," and U.S. patent application Ser. No. 14/815,737 filed concurrently entitled "METHOD AND SYSTEM FOR SECURELY STORING PRIVATE DATA IN A SEMANTIC ANALYSIS SYSTEM." The content of the aforementioned patent applications is hereby expressly incorporated by reference in its entirety.

BACKGROUND

Organizations may be interested in monitoring communications related to items of interest (e.g., topics, products, brands, etc.), and/or may be interested in understanding a nature and context of communications regarding topics of interest both within the organization and communications from public sources of data. Communications within the organization may refer to emails, letters, telephone calls, etc. Public data communications may comprise social media data, community data and any other type of public data. The communications may pertain to a wide range of different topics directed to sales inquiries, customer complaints, product feedback, etc.

It may be beneficial to the organization to understand a content and context of the communications, and monitor communications based on topics of interest to the organization. In many cases, these communications may have to be sorted out manually, organized to understand a quantity and/or quality of the communications, and then be directed to a designated person or authority within the organization. However, manually handling these communications in order to determine the context of communications and an extent/degree of the communications is extremely time-consuming. Given the overwhelming quantity of such messages received by a typical organization (e.g., business, non-profit, or any other entity) it is evident that a manual approach to process these messages can be quite tedious, inefficient, and does not scale very well for many organizations.

Automated processes have been used, but results of such automation tend to be hit or miss since conventional processes are often focused on the simple process of using keyword searching/matching. This approach can be very problematic if the message does not contain the appropriate keyword from a list of pre-programmed keywords, or if the keyword matched in the message pertains to a topic that does not accurately correspond to the true topic of the message. Further, this approach requires a user at the organization to routinely check for the pre-programmed keywords, which proves to be highly time-consuming and inefficient.

Often, traditional approaches of receiving communications related to an organization tend to be slower when compared to communications developing around a topic in social media or other social outlets. However, receiving these communications on a timely basis can be hugely beneficial to the organization in order to appropriately respond and/or perform tasks based on this information. For example, consider an organization that has recently launched a product. It may be beneficial to understand the context and significance of the general chatter around the launched product, and to be notified of the extent, significance and/or the direction (e.g., positive feedback, negative feedback, etc.) of the communications that are taking place in both private and public platforms.

Therefore, there is a need for an improved approach to analyze and process communications related to an organization and timely communicate a content and/or analysis of the communications to the appropriate authority at the organization. Other additional objects, features, and advantages of the invention are described in the detailed description, figures, and claims.

SUMMARY

The present disclosure is directed to an approach for integrating one or more enterprise applications with a social networking application. According to some embodiments, a method comprises providing a semantic analysis system that automatically generates alerts. The method comprises receiving a set of alert rules, associating the set of alert rules with a topic vector, wherein the topic vector is a representation of semantic significance of one or more terms, categorizing a set of messages based at least in part on analysis of the set of messages against the topic vector, retrieving the set of alert rules to be applied to the categorized set of messages, wherein the alert rules define a threshold number of messages that triggers an alert, counting a number of messages in the categorized set of messages that satisfy the set of alert rules, and if the counted number of messages exceeds the threshold number defined in the alert rules, generating the alert.

Other and additional objects, features, and advantages of the invention are described in the detailed description, figures, and claims.

DETAILED DESCRIPTION

Figure 1:
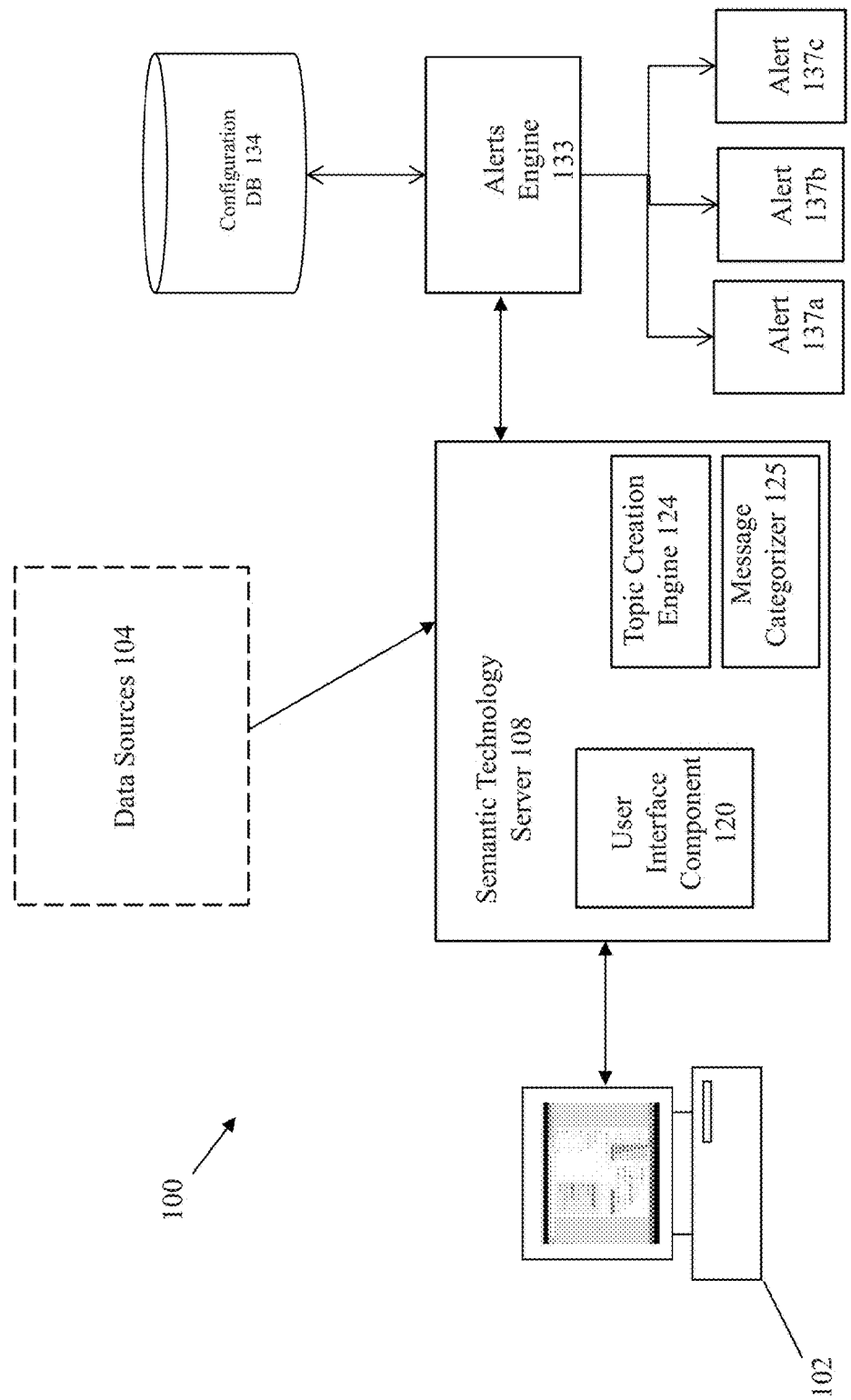
FIG. 1 illustrates an example system which may be employed in some embodiments of the invention.

Embodiments of the present invention(s) provide a system, method, and computer program product for allowing an entity to perform semantic analysis upon data of interest to an organization, and to automatically generate alerts to users associated with the entity based on defined alert rules. Embodiments of the present invention provide a system, method, and computer program product for allowing an entity to define a set of rules pertaining to a desired set of semantic analysis data, and to receive periodic alerts when the set of rules has been satisfied.

The present disclosure therefore provides great benefit to an entity (e.g., business, individual, etc.) to allow it to monitor the content of the communications, identify ranges of topics, and timely receive alerts on the content and context of the communications. By being timely alerted on the nature of the communications surrounding the enterprise, the business can then act upon that information to identify actionable messages, for example, to identify potential customers and possible sales leads or to identify problematic situations that may require immediate involvement of customer service personnel.

For example, consider a CRM (Customer Relationship Management) application, which is designed to facilitate the ability of a business to create, develop, and build relationships with its customers or potential customers. It would be very desirable to allow the business CRM application to stay informed of actionable message content, and to be periodically notified based on the nature of messages being generated around one or more desired topics. For example, if the sentiment of communications around a recently launched product is overwhelmingly negative, an alert may be triggered, thereby notifying the user. This information may be very helpful to the organization in order to timely resolve the issues(s) related to the launched product rather than awaiting reviews in more traditional news avenues. The goal may be to have a "pulse" on the communications and to be timely notified such that the organization may taken appropriate action.

Advantageously, the semantic analysis system may be programmed to include an alerting mechanism in order to communicate a nature (or a change in the nature) of messages/communications of interest to the enterprise users. For example, a user may not always have time/be interested in manually logging into the SaaS system to better understand the nature of messages around a particular topic. Rather, the user may be better served by receiving a communication (e.g., email, text, social media message, etc.) when an unusually high number of messages are being circulated about a topic, or when there is a change in the sentiment of messages around a particular topic, or there is a high number of negative comments/posts/messages being receiving for a particular topic, to name a few example situations. To this end, the semantic analysis system allows for the creation of a number of rules based on which alerts may be received.

The alerts, which may include valuable information on the nature/change in nature of the conversation surrounding a desired topic, may empower the organization to best tailor a response to any situation/crisis surrounding the business, if any, and may ensure that the organization receives information about an underlying trend/sentiment that may not have been timely received by conventional means. Although many embodiments disclosed here are discussed in the context of enterprise solutions, it should be appreciated that the inventions disclosed herein may apply to any type of individual, entity and/or organization.

FIG. 1 illustrates an example system 100 which may be employed in some embodiments of the invention. The system includes one or more users at one or more user stations 102 that operate the system. The user station 102 comprises any type of computing station that may be used to operate or interface with the applications in the system. Examples of such user stations 102 include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a mouse or keyboard to manipulate a pointing object in a graphical user interface to generate user inputs. Some embodiments of the present disclosure provide a mechanism for allowing data to be accessed by a semantic analysis system, and receiving alerts based on the semantic analysis.

The semantic analysis system may refer to a system that performs semantic analysis on a set of data associated with one or more entities or organizations. Semantic analysis is especially helpful in determining an underlying meaning and/or a context of terms used in language. Semantic analysis may refer to determining a semantic significance of words in the received set of data relative to the many other possible semantic dimensions of the words. Semantic significance may refer to a known meaning or context of a term. A term may have many meanings or semantic significances. Semantic analysis allows data to be parsed in a manner that is cognizant of one intended semantic significance of one or more terms while disregarding data that is unrelated to the intended semantic significance. Thus, the goal of semantic analysis is that the analyzed data will then be more relevant to the user, because the data corresponds to an underlying context or meaning desired by the user, while disregarding data that is unrelated to the meaning desired by the user even if it contains the same terms.

For example, a word may have many meanings or semantic significances associated with it. The same word may have various connotations, sometimes ones that are diametrically opposite to each other. These various meanings or dimensions may be represented mathematically by vectors, as will be described in further detail below. Consider a simple word, "bark." In one context, the word "bark" may be the verb that refers to a sound produced by dogs. In another context, the word "bark" may refer to a curt or angry response by a person. In yet another context, the word "bark" may refer to the outside covering of a tree. Thus, a single word may have multiple semantic significances. The goal of the semantic analysis system is to determine the semantic significance that most closely aligns with the semantic significance that is of interest to an entity.

Themes may be identified, for example, by performing semantic analysis and identifying semantic clusters within the analyzed data. The semantic clusters correspond to one or more themes within the data. For example, latent semantic analysis (LSA), an advanced form of statistical language modeling, can be used to perform semantic analysis upon the content. This permits the system to understand the contextual and semantic significance of terms that appear within the data. For example semantic analysis can be used to understand the difference between the term "Galaxy" used in the astronomy context, and "Galaxy" that is used to refer to the name of a professional soccer team.

To this end, and as will be described in greater detail below, the many semantic significances of one or more terms are represented as mathematical vectors. In the above example, the word bark, as in bark of a dog may be assigned a first semantic significance through a first mathematical vector (e.g., having a magnitude and direction), and the word bark, as in tree bark may be assigned another semantic significance through a second mathematical vector (e.g., having another magnitude and direction). In this way, mathematical vectors are assigned to a large bank of terms in a particular language (and the similar process is repeated for other languages), and stored for reference in order to determine the semantic significance of terms in received data.

In order to understand the semantic significance of words of interest to a particular entity, topics are created, in which a user associated with the entity defines the semantic significance of one or more terms of interest. In doing so, the user is essentially selecting one or more mathematical vectors over other mathematical vectors associated with a term (e.g., choosing "bark" as in tree bark, over "dog bark"). Topics can be created, which provides an approach to capture the scope of a given set of subject matter. The topic definitions can then be used, for example, to automatically classify data, e.g., by determining whether a given message/post falls within the topic definition. Based at least in part upon performing semantic analysis, themes may be identified within the data.

In order to perform semantic analysis on the data received from the entity, the mathematical vectors of terms in the received data are compared to mathematical vectors associated with created topics, in order to semantically categorize the data based on topics or terms that are of specific interest to the user.

A semantic technology server 108 receives data from one or more data sources 104. In one or more embodiments, the data may be associated with an enterprise, entity, organization or individual. In one or more embodiments, an entity may refer to a business. The business may be an enterprise or business organization that is engaged in an activity (e.g., selling of goods or services, etc.) for profit. The enterprise may be a large business organization (e.g., having more than 1000 employees, etc.) The enterprise may refer to any undertaking by an individual or group of individuals for profit. In one or more embodiments, the enterprise may be a business unit or firm (e.g., law firm). The enterprise may be a corporation, in one or more embodiments. In one or more embodiments, the entity may refer to a small business (e.g., having less than 1000 employees). The enterprise may deal with goods or services in any area (e.g., software, pharmaceuticals, engineering, manufacturing, etc.)

In other embodiments, the entity may refer to a non-profit organization. The non-profit organization may be an organization that uses surplus revenues to achieve a purpose or mission rather than using the revenues for profit. The entity may refer to any type of non-profit organization having any number of employees. In other embodiments, entity may refer to a government agency. The government agency may be a local governmental agency, a state government agency, a federal agency or even some international government agency. The government agency may provide may be a permanent or semi-permanent organization in a government that is responsible for oversight and administration of specific functions. The government agency may have any number of employees.

The entity may refer generally to any organization comprise a plurality of people, such as an institution that has a collective goal. In one or more embodiments, the entity may be an individual (e.g., a solo business owner, etc.). In one or more embodiments, an entity is a customer or tenant of a system that serves one or more tenants or one or more customers and offers services to employees or user accounts for the customer or tenant.

The data may be collected through a plurality of data sources. Such data sources 104 include, for example, enterprise data comprising private communications from within a business.

In one or more embodiments, enterprise private data refers to data corresponding to communications within a business. The enterprise private data may be associated with messages and responses from one or more employees, for example. For example, an enterprise call center may produce many messages private to an organization that needs to be processed. Or, in another example, enterprise data may refer to data collected from an enterprise social media system. Or, in another example, enterprise data may refer to data collected from social networks that the entity has one or more accounts in. In one or more embodiments, enterprise data may be any data owned by the enterprise. It should be appreciated that public data may be similarly used, in one or more embodiments.

Enterprise community data may also be provided to the system from hosted customer communities, such as for example, data from Jive or Lithium. The data sources 104 may also include public data sources, such as social media sources, a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types. It is noted that while the currently described embodiment describes analysis of these specific types of data, the inventive concepts are applicable to analysis of other types of content as well.

Semantic analysis is performed upon the data by the semantic technology server 108. The semantic technology server 108 may be implemented as a standalone semantic analysis tool, or can be included as a component within another tool, e.g., a social relationship management tool. As described above, in some embodiments, the semantic technology serve 108 may be implemented as a SaaS platform, performing semantic analysis as a service by receiving data from a plurality of sources and providing semantic analysis to various entities.

In one or more embodiments, the semantic analysis system may be a Software-as-a-service ("SaaS) platform that may perform semantic analysis on a plurality of data sources, and the semantic analysis may be consumed by one or more organizations on a subscription basis. For example, each customer of the semantic analysis system may be provided access to a dedicated portion of the platform such that semantic analysis parameters may be defined, and results may be viewed and analyzed, as will be described in further detail below. In other embodiments, the semantic analysis system is simply implemented as an on-premise or standalone tool that may be implemented to be a part of an already existing technology platform.

In some embodiments, the semantic technology server 108 comprises a topic creation engine 124 to create topics with respect to the collected data. The topic creation engine 124 processes the data using semantic analysis to identify themes within the data. The identified themes are used to create definition parameters for a new topic, e.g., by adding semantic filters that pertain to the identified themes. In operation, the topic creation engine 124 may access a semantic space (not shown) to perform the themes analysis. The topics definitions created using the topic creation engine 124 may be stored in a configuration database 134.

The semantic technology server 108 also comprises a message categorizer 125. The message categorizer performs message categorization to analyze the content of the data from the data sources 104.

In one or more embodiments, the semantic technology server 108 may also comprise an alerts engine 133 to allow for the creation of rules based on which alerts may be generated for the categorized messages. As shown in FIG. 1, the semantically analyzed messages are sent to the alerts engine 133. The alerts engine 133 may access the configuration database 134 to retrieve configuration parameters associated with the semantically analyzed messages. In one or more embodiments, the configuration database 134 may comprise rules that are associated with defined topics (e.g., created through the topic creation engine 124). The alerts engine 133 may retrieve these rules, and generate alerts (e.g., 137a, 137b, 137c) to various endpoints based on the retrieved rules, as will be described in further detail below.

A user interface component 120 generates the content that is visually displayed to a user at user station 102. The user interface component 120 may also be used to retrieve user inputs through the user interface to control the operations of the topic creation engine 124 and/or message categorizer 125. The user interface component 120 may also be used to view one or more generated alerts.

The configuration database 134, and/or analysis results can be stored in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device could also be implemented as an electronic database system having storage on persistent and/or non-persistent storage.

Any of the components/servers in the above-described system may include a bus or other communication mechanism for communicating information, which interconnects subsystems and devices, such as processor, system memory (e.g., RAM), static storage device (e.g., ROM), disk drive (e.g., magnetic or optical), communication interface (e.g., modem or Ethernet card), display (e.g., CRT or LCD), input device (e.g., keyboard, touchscreen). The system component performs specific operations by the processor executing one or more sequences of one or more instructions contained in system memory. Such instructions may be read into system memory from another computer readable/usable medium, such as static storage device or disk drive. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive. Volatile media includes dynamic memory, such as system memory. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computing system. According to other embodiments of the invention, two or more computing systems coupled by a communication link (e.g., LAN, PTSN, or wireless network) may perform the sequence of instructions required to practice the invention in coordination with one another. The system component may transmit and receive messages, data, and instructions, including program, i.e., application code, through communication link and communication interface. Received program code may be executed by the processor as it is received, and/or stored in disk drive, or other non-volatile storage for later execution.

Figure 2:
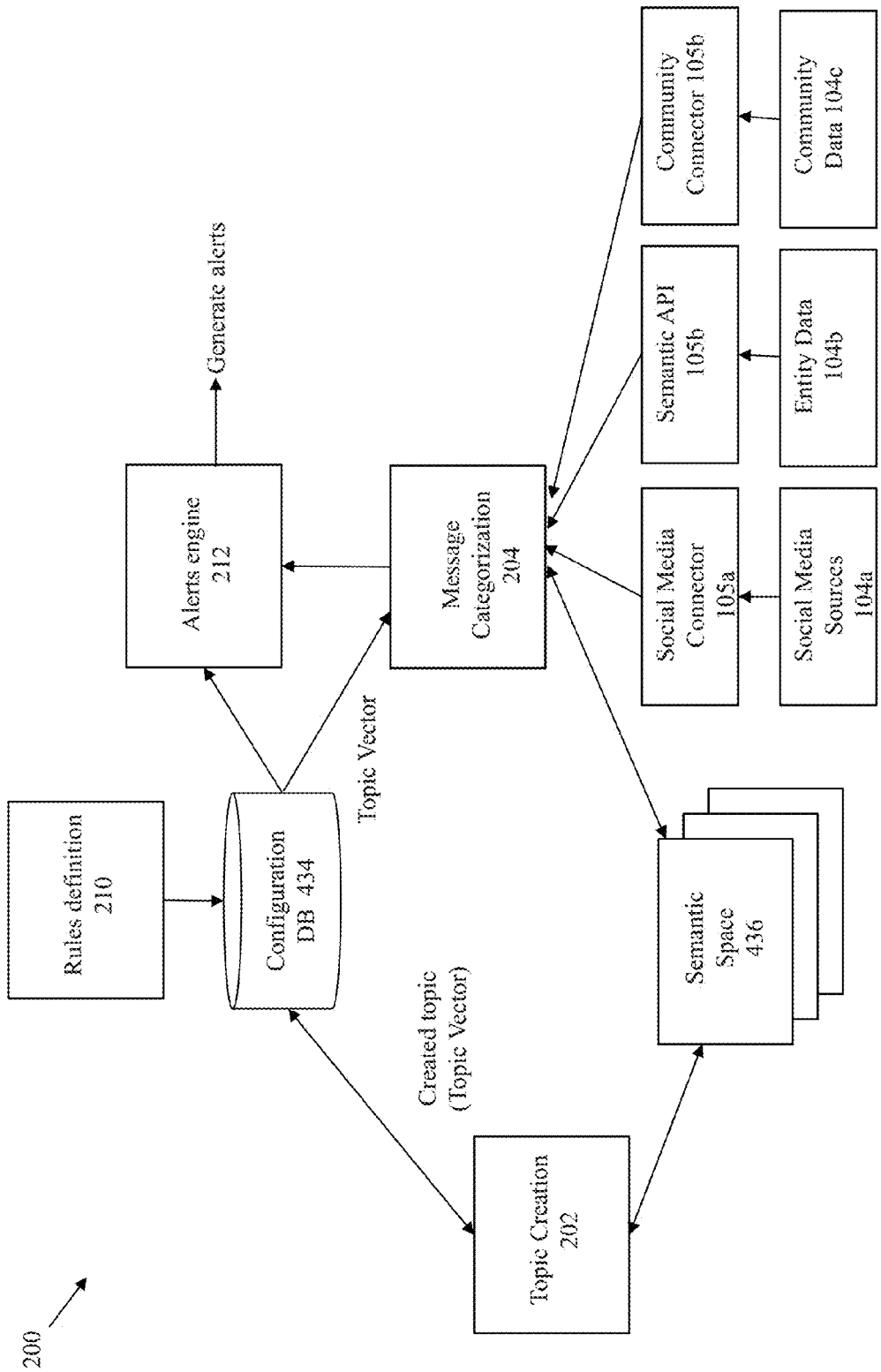
FIG. 2 illustrates an example system that performs alert generation according to some embodiments of the invention.

FIG. 2 illustrates an example system that generates alerts based on defined rules and categorized messages for one or more topics. A topic creation mechanism 202 can be used to create a new topic, which is saved into the configuration database 434. A message categorization mechanism 204 accesses the topic vectors for the created topics, and the defined rules and uses the topic vectors to identify topics within data from social media sources. As will be described in further detail below, a topic vector is a mathematical representation of a semantic significance of one or more terms of interest to a user or entity. Further details on how topic vectors are created will be provided further below.

Similarly, a rules definition mechanism 210 may be used to create a collection of rules based on which to generate alerts, which is also saved into the configuration space 434. The saved rules are directed to a message counting/processing mechanism through the alerts engine 212 that processes messages based on parameters of created topics and counts them in order to determine if the number of messages reaches a defined threshold. If the threshold is met, alerts may be generated. It should be appreciated that the above embodiment (of generating alerts based on frequency of messages) is for illustrative purposes, and alerts may be generated based on any type of rule(s) defined by the user. In one or more embodiments, the defined rules are associated with one or more created topics. In other words, the user may define alert rules when creating the topic. On the back-end, the created topic vector may be associated with parameters defined by the alert rules.

As noted above, the data processed by the system may be from any data source, including public social data (104a), entity data (104b), and/or community data ('104c). One or more connectors 105a can be built to interconnect with the social media data sources 104a. These connectors can be built using APIs provided by the social media sites to access the data on those sites. In a similar way, one or more connectors 105c can be built to interconnect with the sites that host enterprise community data 104c.

With entity data 104b (e.g., data private to an enterprise, etc.), a more flexible framework can be provided to allow organizations to themselves provide data to be processed by the system. In some embodiments, a semantic API 105b is provided to enable organizations to call into the system to load the private data. This approach therefore avoids the requirement to build a custom connector for each and every enterprise that seeks to load its data for processing. In other embodiments, connectors may be used for data sources desired by one or more entities.

Figure 3:
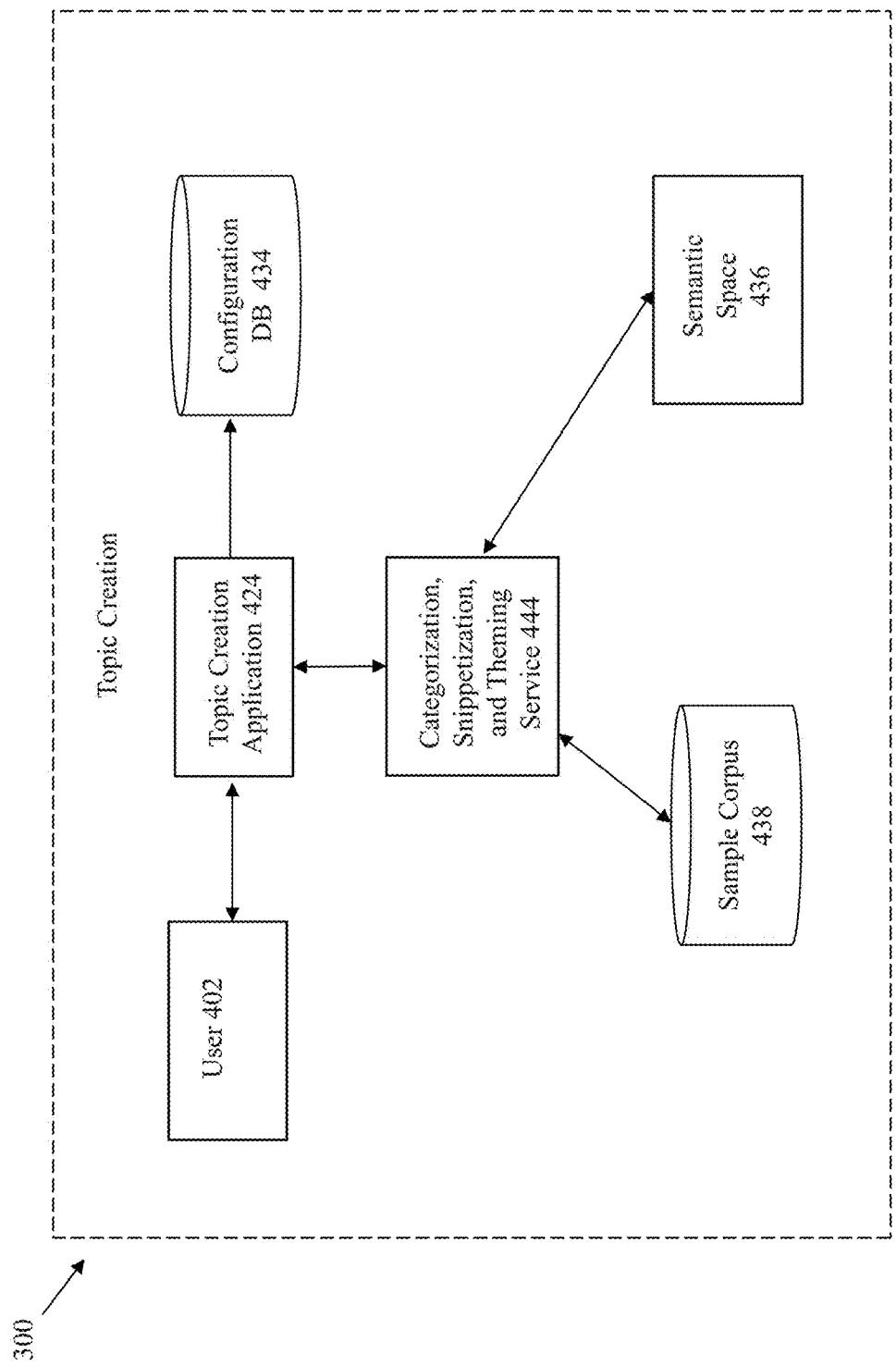
FIG. 3 illustrates an example architecture that can be used to perform topic creation according to some embodiments of the invention(s).

FIG. 3 illustrates an example architecture 300 that can be used to perform topic creation according to some embodiments of the invention(s). A topic creation mechanism/application 424 is used by a user 402 to create the new topic. The topic creation mechanism/application comprises any combination of hardware/software that is configured and/or programmed to perform the actions specified herein. New topics created by the topic creation mechanism/application 424 can be stored into a configuration database 434. In one or more embodiments, the configuration database 434 may store topics associated with a plurality of customers of the sentiment analysis system. In other embodiments, each customer may be associated with a separate configuration database 434. The following embodiments will focus on a single configuration database 434, but it should be appreciated that other variations may also be similarly implemented.

The topic creation mechanisms/application 424 interfaces with a categorization, snippetization, and theming service 444. The service 444 provides functionality to perform categorization of a given set of content using semantic analysis. The analysis may be provided over the full content of a data item, or may instead be applied to a "snippet" from the data comprising a more targeted subset of the data. Theme identification of the data may also be performed by service 444. While these functions are described in conjunction with a single service 444 in FIG. 3, it is noted that any number and/or combination of one or more components/services may be utilized in practice to accomplish the described functions.

The service 444 may access a sample corpus 438 to perform its functions. The sample corpus 438 comprises a collected set of data from which the desired analysis is to be performed. In some embodiments, the sample corpus 438 comprises a rolling three month window of collected data. In other embodiments, the sample corpus 438 may comprise sample data particular to each customer of the semantic analysis system. This may be important in order to capture the appropriate context and/or meaning of a topic as used by the customer organization. In other embodiments, a common sample corpus having a variety of data types may be used for a plurality of customers.

A semantic space 436 is accessed to perform semantic analysis upon data from the sample corpus 438. The semantic space 436 comprises a collection of vector values for a number of dimensions that are identifiable for terms within the data to be analyzed. These vector values are usable to understand the actual meaning of terms when used in different contexts. Mathematical computation and comparison of the term vectors allows one to determine the underlying meaning of various themes and documents. In one or more embodiments, a common semantic space may be used for a plurality of customers. In other embodiments, a dedicated semantic space may be employed for each customer. In other embodiments, especially for language identification or language-based semantic analysis, a different semantic space may be accessed based on a desired language.

Figure 4:
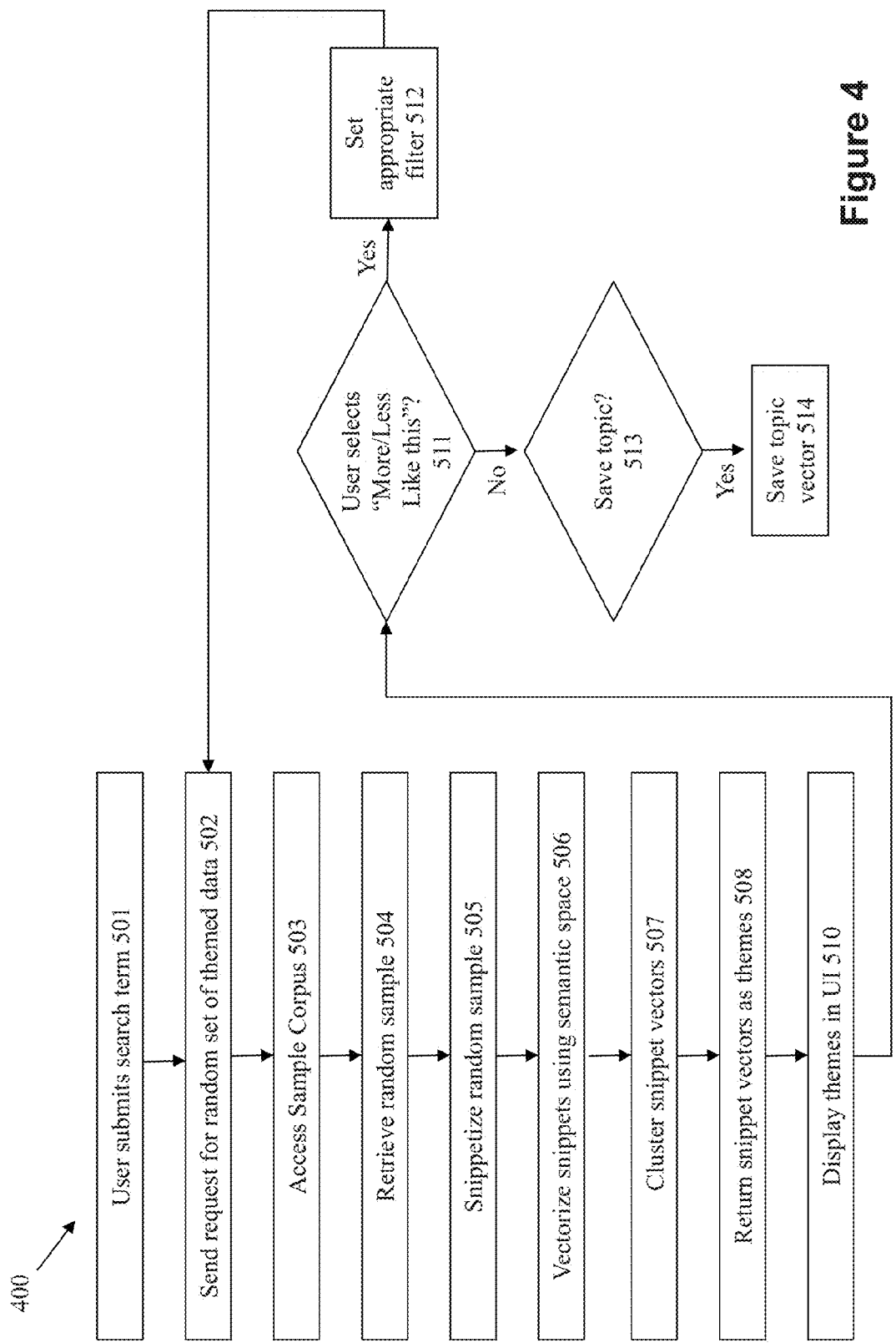
FIG. 4 shows a flowchart describing how the architecture of FIG. 3 is usable to perform topic creation.

FIG. 4 shows a flowchart 400 describing how the architecture of FIG. 3 is usable to perform topic creation. At 501, the user submits an initial search term from the user interface to the topic creation mechanism/application 424.

Next, at 502, the topic creation mechanism/application 424 sends a request for a random set of themed messages to the service 444. The request is for a random set of the data. The general idea is that, instead of performing analysis upon the entirety of the data, the analysis can be performed for a selected sampling of the data. Assuming that the samples are properly extracted from the underlying content with adequate randomness, the sampled data should provide a reasonably representative sample of data for the analysis. For example, a sample size of 500-1000 can be retrieved in some embodiments to perform the sampling. In an alternative embodiment, sampling is not employed—this approach analyzes all of the underlying content.

At 503, the service 444 accesses the sample corpus 438 to obtain a random selection of messages using the initial search term. The selection may be performed by using the search term to perform a keyword/Boolean query against the data within the sample corpus 438.

At 504, a random sample of messages is returned to the service 444. Next, at 505, the random sample of messages is snippetized into "snippets". The snippet may not be the entirety of the message content. Instead, the snippet may only contain a given number of words on either side of the occurrence of the word/topic of interest ("anchor term") within the content. For example, if the search term of interest is "Galaxy", then snippets can be created that extend 200 words in either direction from any suitable occurrence of that word within the message content. Grammatical boundaries may also be used to define the extent of a snippet, e.g., by using sentence or paragraph boundaries to adjust the cut-off point for a snippet.

One reason for using snippets instead of the entire message content is because this approach may provide a much more accurate assessment of the meaning/context or a document. For example, consider if the search term is the term "Galaxy", where only a very small portion of the message actually pertains to that term. If a snippet is identified which is centered around that term, and only that snippet of the message is semantically analyzed, then it is likely that the semantic analysis will produce a relatively accurate semantic understanding for how that terms is used in the message. On the other hand, if the entirety of the message is semantically analyzed instead, and the vast majority of the message is focused on a different subject matter from that term "galaxy", then it is possible that the semantic meaning of how the term is used may be obscured by the overwhelming weight of the rest of the message which has no pertinence to that term.

At 506, the snippets that correspond to the random sample of messages are vectorized using the semantic space 436. The semantic vectors are created across a number of dimensions for the term vectors (e.g., across 300 dimensions). The semantic vectors are mathematical representations of the semantic significance of one or more terms of interest to a user. The vectorized topics are analyzed against the vectorized messages to determine whether they can be categorized for that topic, as will be discussed below.

The vectorization is performed for all of the words within the snippets. In other words, a vector is obtained for each word in the snippet. The vectors for a given snippet are averaged together to obtain a single, overall vector for the snippet. This provides a mathematical value for the context/meaning of that snippet.

At 507, snippets are clustered together, where vector comparisons are performed so that snippets having similar vectors are clustered together. Clustering may be performed, for example, by using the KMeans++ approach to clustering.

A given cluster of vectors corresponds to a single theme. Therefore, at 508, the clustered snippets are returned as themes. At 510, the themes are displayed to the user in a user interface. The user interface includes interface elements to permit the user to select one or more of the themes to create semantic filters.

At 511, a determination is made whether the user has selected any of the themes for a new semantic filter. For example, a determination is made whether the user has selected a "More Like This" or "Less Like This" button for a given theme. If so, then at 512, a new semantic filter may be created. The actions starting from 502 may be repeated to obtain a new set of search results that accounts for the new semantic filter.

At 513, a determination is made whether the user desires to save the new topic. If so, then the topic vector is saved at 514. In one or more embodiments, the average of the vector(s) of the selected themes forms the value that corresponds to a topic vector that is saved for the new topic. This topic vector may then be saved into the configuration database 434.

Figure 5:
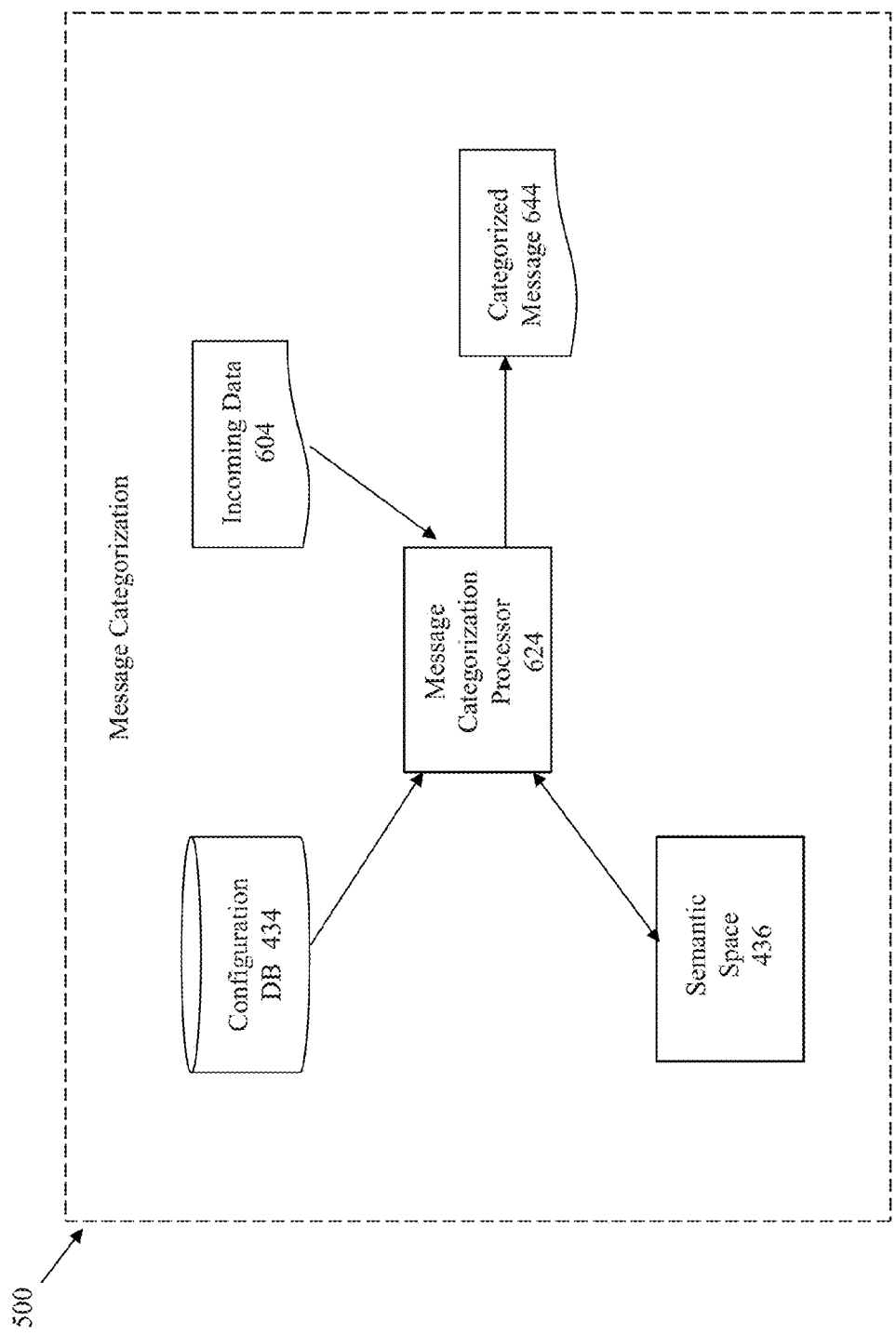
FIG. 5 illustrates an architecture of a system for performing message categorization.

FIG. 5 illustrates an architecture 500 of a system for performing message categorization. A message categorization processor 624 receives incoming data 604 from one or more sources. The message categorization processor 624 also receives topic vectors from the configuration database 434.

The message categorization processor 624 can be implemented as a pipeline processing mechanism, comprising a number of pipeline stages for the processing of data. One of the pipeline stages may pertain to categorization of messages. Other pipeline stages may be employed to perform other functions, such as spam processing, deduplication, sentiment analysis, and term analysis.

It should be appreciated that data from private sources may need to be handled differently from public social data, especially when a common multi-tenant system is used to handle data from multiple private and/or public sources.

In one embodiment, a separate pipeline processing mechanism is provided for each private source of data. In this approach, a first enterprise will use its own first private pipeline processing mechanism to perform message categorization on its private messages, and a second enterprise will use a second private pipeline processing mechanism to perform message categorization for its separate private messages. The possible problem with this approach is that, in a multi-tenant system, this approach may be quite expensive and may not be easily scalable.

In an alternate embodiment, common pipelines may be used to process the data from multiple sources. However, unique identifiers may be used to handle the messages differently from the different sources. In this approach, topics created by each enterprise are associated with that enterprise by using an identifier (e.g., customer ID) associated with that enterprise. In addition, private messages from that enterprise are also associated with the same identifier/customer ID. As the private messages are processed through the common pipeline, the unique identifier associated with the private messages is used to load topics specific for that enterprise (which are identified since they are associated with the same identifier). The private messages are then categorized using those topics, and are routed to the appropriate destination after categorization. Further details on this aspect are disclosed in U.S. patent application Ser. No. 14/815,737 entitled "METHOD AND SYSTEM FOR SECURELY STORING PRIVATE DATA IN A SEMANTIC ANALYSIS SYSTEM," incorporated by reference above.

For message categorization, the message categorization processor 624 utilizes the semantic space to vectorize the message content. A comparison is performed against the topic vectors to identify one or more topics that may be associated with the message content. If any topics are identified, then the message content can be annotated and/or tagged to identify the topic. Thereafter, the categorized content 644 is released for downstream usage or storage, e.g., to be viewed using a dashboard tool or for routing to a downstream application such as a CRM (customer relations management), HR (human resources), or marketing application.

It may be the case that a single semantic space 436 is not sufficient to handle message categorization for multiple enterprises. This is because the terminology of interest to a first enterprise may not be of interest to a second enterprise. For example, the term "Galaxy" may have a first meaning to a company in the mobile phone space but have an entirely different meaning to a company in the sporting equipment/apparel space. Therefore, one approach (as briefly discussed above) may be to provide a separate semantic space 436 for each customer (as needed). This approach may be initiated by checking if the common semantic space is usable, and if not, to then create the new semantic space once the need has been identified.

Figure 6:
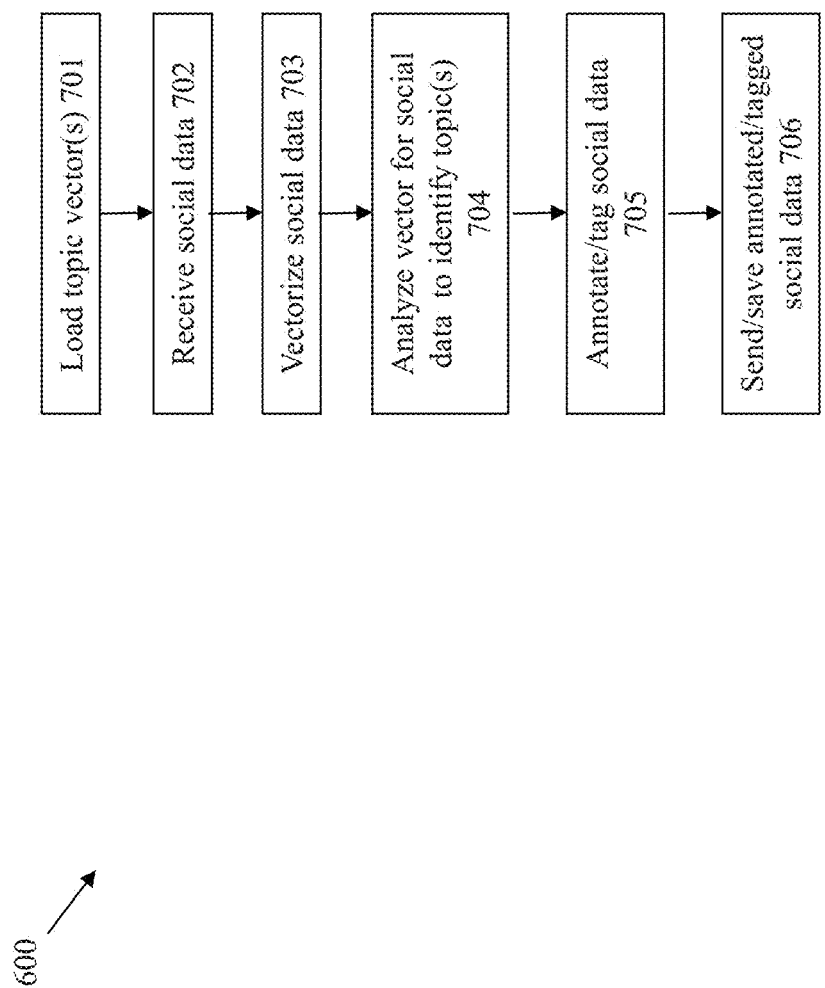
FIG. 6 illustrates a flowchart of an approach for performing message categorization using the architecture of FIG. 5.

FIG. 6 illustrates a flowchart 600 of an approach for performing message categorization using the architecture of FIG. 5. At 701, the message categorization processor 624 loads topic vectors from the configuration database 434 for any created topic(s). In a commercial setting, these topic vectors pertain, for example, to any topics/dimensions set up by a user for a given brand and/or product. In this context, the topics comprise a given brand or product name. The dimensions may pertain to consumer intent, interest, or psychographics.

At 702, an item of social media content (e.g., a message) is received by the message categorization processor 624. At 703, the message is vectorized. The semantic space 436 is accessed to vectorize the message to create a message vector. Similar to the above, the messages are vectorized by consulting the semantic spaces to determine the mathematical vectors associated with the message.

At 704, the message vector is analyzed relative to the topic vector(s). In one or more embodiments, this may be performed, for example, by calculating the cosine of the message vector against each topic vector. The similarity of the message vector to the topic vector is computed by calculating this cosine value, to check for one of the following:

Identical meaning: value of cosine=1

Unrelated meaning: value of cosine=0

Opposite meaning: value of cosine=−1

A threshold distance to any of the above values

A message that relates to one of the created topics would correspond exactly or generally to the appropriate cosine value from performing the calculations. One or more thresholds may be configured for the cosine values to determine whether or not the message matches to a topic.

At 705, any message that is identified as being associated with a given topic can be annotated and/or tagged to indicate the association. Thereafter, at 706, the annotated/tagged message exits the message processor 624 to a downstream location.

Essentially, the semantic analysis system loads one or more topic vectors, vectorizes the messages received from various sources, and compares the vectorized messages against one or more topic vectors. A few methods of analysis have been discussed above. In one or more embodiments, a similarity between the topic vector and the vectorized messaes is determined. If the similarity degree is deemed to be sufficient, the vectorized messages are categorized for that topic. In one or more embodiments, the vectorized message may be annotated with the topic vector.

Figure 7:
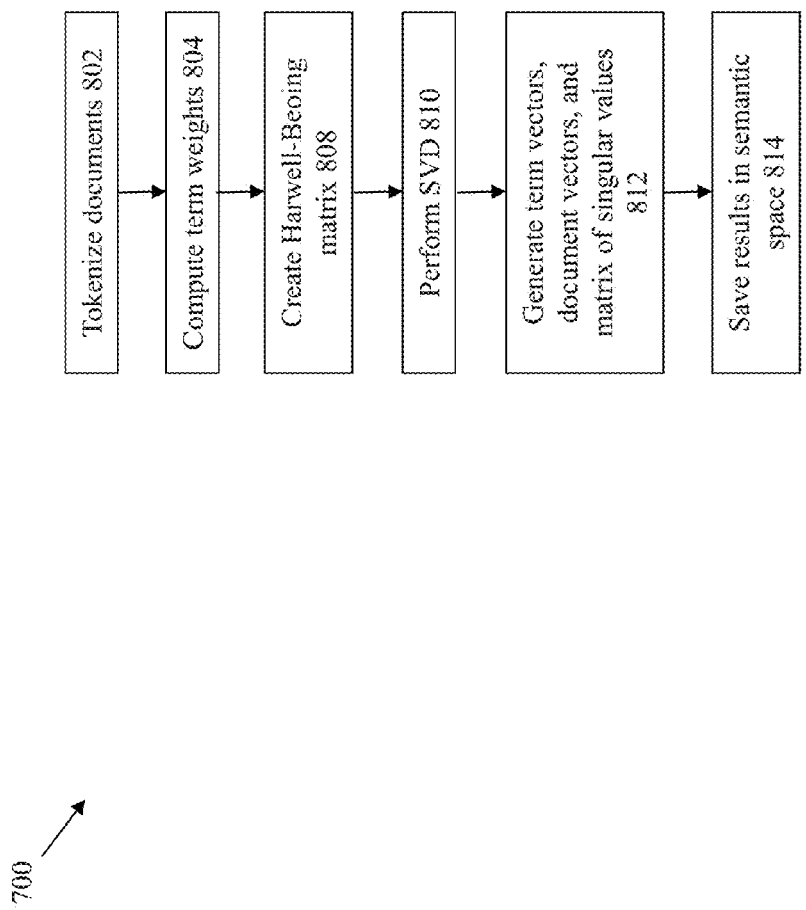
FIG. 7 shows a flowchart of an approach to create a semantic space according to some embodiments.

FIG. 7 shows a flowchart 700 of an approach to create a semantic space according to some embodiments of the invention(s). The general overview is that a learning model may be implemented to represent terms as high-dimensional vectors within the semantic space. Singular value decomposition (SVD) may be employed to reduce a matrix of terms into a set of multidimensional vectors.

At 802, incoming documents are tokenized. This action is performed in some embodiments by (a) normalizing punctuations, (b) identifying co-locations; and (c) removing stop words. Stop words to be removed may include, for example, "and", "or", "the", "to", "be", "is", "at".

At 804, term weights are computed for the tokenized content. A global frequency is computed for the terms. In addition, a global weight (e.g., entropy) is computed for the terms. The terms can also be sorted at this stage.

At 806, a matrix of the terms is created. The matrix can be formed with content passages as rows and words as columns, where cells contain the number of times that a given word is used in a given passage. The cell values are transformed into a measure of the information about the passage identity the carry. The matrix can be formed as a Harwell-Boeing matrix.

In some embodiments, the matrix is formed using the following example process:

For each document d
    For each term t
        Create a Cell value using the global weight;

It should be appreciated that other approaches may be used to create the matrix, and the foregoing approaches are provided for illustrative purposes only.

At 808, singular value decomposition is applied to represent the words and passages as vectors in a high dimensional semantic space. At 810, the process generates (a) term vectors, (b) document vectors, and (c) diagonal matrix of singular names. The results are saved, at 812, into the semantic space.

Figure 8:
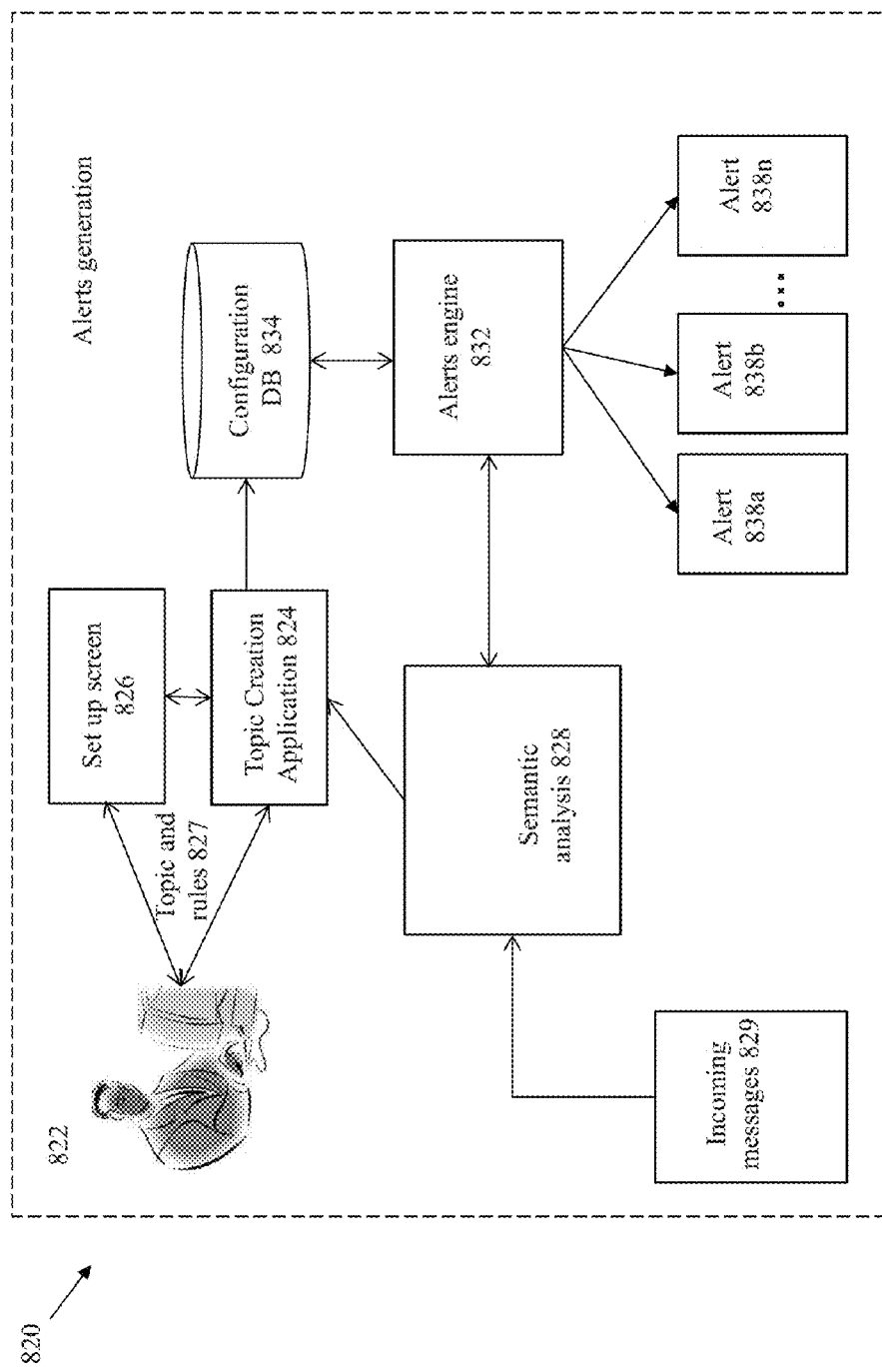
FIG. 8 illustrates an example architecture that can be used to perform alert generation according to some embodiments.

FIG. 8 illustrates an example architecture 820 that can be used to generate alerts according to some embodiments of the invention. A topic creation mechanism/application 824 is used by a user 822 to create the new topic through a set-up screen 826. The topic creation mechanism/application 822 comprises any combination of hardware/software that is configured and/or programmed to perform the actions specified herein. New topics created by the topic creation mechanism/application 824 can be stored into a configuration database 834.

The user also may specific alert rules for the created topic through the set-up user interface 826. The set-up interface comprises any combination of hardware/software that is configured and/or programmed to perform the actions specified herein. The set-up screen 826 receives a set of parameters from the user regarding alert generation. The user may define a set of parameters at which to generate an alert for a particular topic. The configuration database 834 may store the defined parameters, and identify that the rules are defined relative to the created topic vector.

For example, the created topic may pertain to the use of "Galaxy" in the professional sport team context, as described briefly above, but rules may be defined such that the user is only alerted when a threshold number of negative comments have been generated for the topic in a certain time period. Or, in another example, an alert may be generated if a large number of messages have been generated in a very short amount of time for "Galaxy". In yet another example, an alert may be generated for the "Galaxy" topic if there is a sudden change in the sentiment of the messages. Thus, the user may define any number of rules that determine when an alert is generated for the topic. This information is also stored into the configuration database 834.

As discussed above, the topic creation mechanisms/application 824 interfaces with the semantic analysis system 828 that performs the categorization, snippetizing and theming functions described with respect to the message categorizer described in detail above. The analysis may be provided over the full content of a data item, or may instead be applied to a "snippet" from the data comprising a more targeted subset of the data. Theme identification of the data may also be performed by service 828, as discussed above.

Similar to above, the service 828 may access a sample corpus (not shown) to perform its functions. One or more semantic spaces (not shown) may be accessed to perform semantic analysis. The semantic space comprises a collection of vector values for a number of dimensions that are identifiable for terms within the data to be analyzed. These vector values are usable to understand the actual meaning of terms when used in different contexts. Mathematical computation and comparison of the term vectors allows one to determine the underlying contextual meaning of various themes and documents. The semantic space may be accessed to create topic vectors for the input terms. In other words, the topic vectors are mathematical representations of topics of interest to the entity or user. The semantic space is accessed to retrieve mathematical representations of various dimensions of semantic significance. Based on additional input received by the user, the value (and direction) of the topic vector is created.

In one or more embodiments, as described above, the incoming messages 829 are also vectorized using the semantic spaces. As described in detail above, the semantic analysis service 828 may analyze the topic vectors relative to the message vectors to categorize the messages from the plurality of data sources into a plurality of topics. Similar to the above, the semantic space is again accessed to determine mathematical representations of the semantic significance of the messages. By vectorizing both the topic and the message(s), the messages may easily be analyzed against the topic vector by comparing the value and direction of the message vector to the mathematical vector value and direction of the topic vector.

In one or more embodiments, the semantic analysis service 828 may forward the categorized messages to the alerts engine 832 that is configured to process the categorized messages to determine whether the messages trigger alerts based on alert rules that are defined for the topic. The alerts engine 832 may further process the categorized messages to determine if a number of messages (e.g., threshold) for a topic satisfy the set of rules defined at the rules set-up screen 826 (and saved at the configuration database 834). For example, if the rules are defined such that an alert is to be generated if the number of negative comments for a particular topic reaches 10,000 in a time period of one hour, the rules engine 832 may keep track of the number of messages and automatically generate an alert when the number is reached. If a threshold number is not reached, no alerts are generated.

The alerts engine 832 may communicate with a number of endpoints (or output channels) 838a-838n to output the alerts. In one or more embodiments, the alert may be a message directed to users of the entity. For example, a user may receive the alert through an email. Or, in another example, the user may receive a text alert. In yet another example, a social media message may be received. The alerts may be generated in any number of output channels. In another embodiment, the alert may refer to a change denoted in the database associated with the entity. For example, the rules for a topic may be defined such that a topic is tagged or annotated at the database level when the number of messages cross a threshold number set for the topic. In this case, the endpoint 838 refers to a database table associate with an entity.

In another embodiment, the alert may refer to an automatic task performed by the system. For example, if the number of messages of a topic crosses a threshold number, the system may be configured to automatically combine the results of a first topic with a second topic. In other words, the alert may trigger a processing function within the organization. In this case, the endpoint 838 may refer to a processing function (e.g., the message categorizer, etc.) within the system. Similarly, the system may be programmed such that alert rules trigger one of many functions. Although the following disclosure will focus on alert generation through messages received in response to the alerts for illustrative purposes, it should be appreciated that the alerts may trigger other functions as well.

Figure 9:
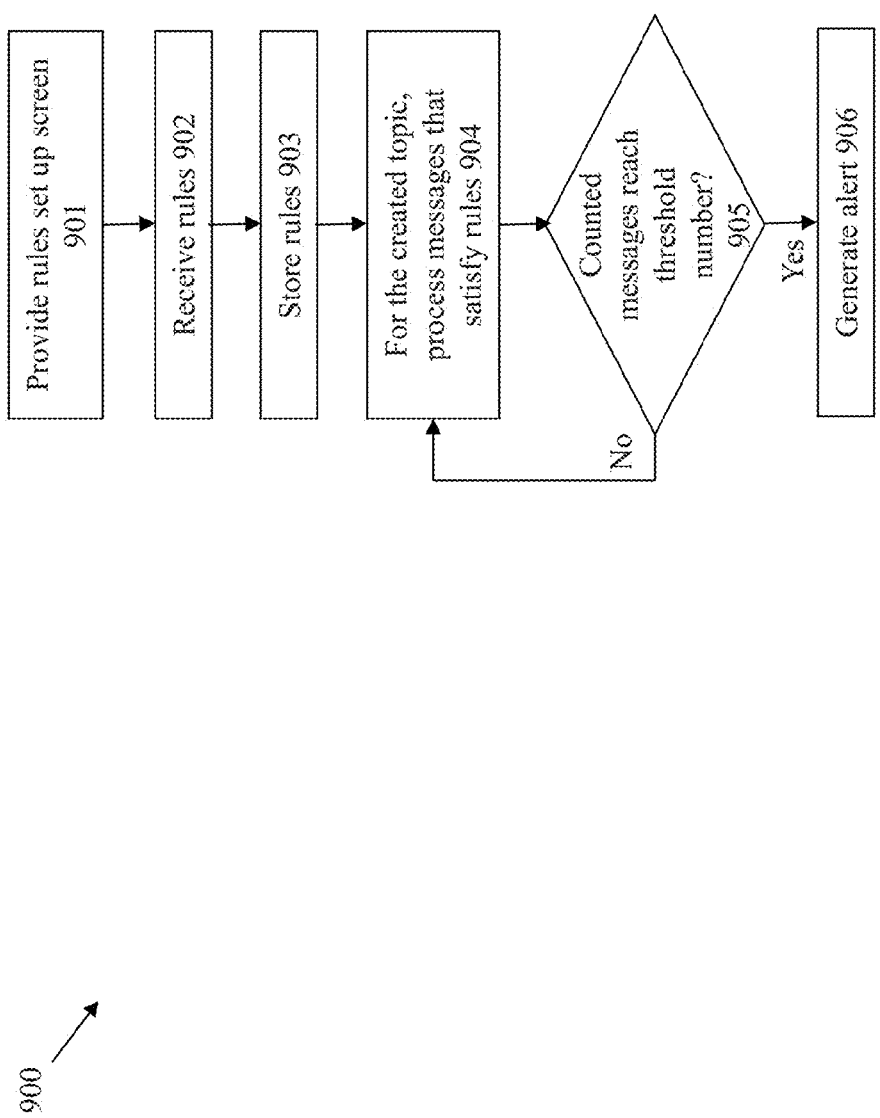
FIG. 9 shows a flowchart describing how the architecture of FIG. 8 is usable to generate alerts.

FIG. 9 shows a flowchart describing how the architecture of FIG. 8 is usable to generate alerts. At 901, the system may present a user interface (e.g., set-up screen) that allows a user to define a set of rules pertaining to alert generation (e.g., a frequency of messages, a change in sentiment within a particular time period, a decrease in the number of messages, a number of messages from a particular geographical location, a number of messages generated at a particular source, etc.). More information on the type of rules will be provided further below.

Next, at 902, the set of rules are received. At 903, the rules are stored at the configuration database. At 904, the alerts engine 832 processes categorized messages to determine if the set of rules are satisfied At 905, a determination is made whether a threshold number of the set of messages that fulfill the set of rules is reached. If the threshold number has been reached, an alert is generated at 906. If the threshold number has not been reached, the counting mechanism of the rules engine continues to count the number of messages (step 904). It should be appreciated that counting is simply one form of processing that may be performed by the rules engine. In other embodiments, alerts may be generated based on an average number of messages, a total number of messages, a variance of a set of messages or any other advance mathematical or statistical operation.

Figure 10:
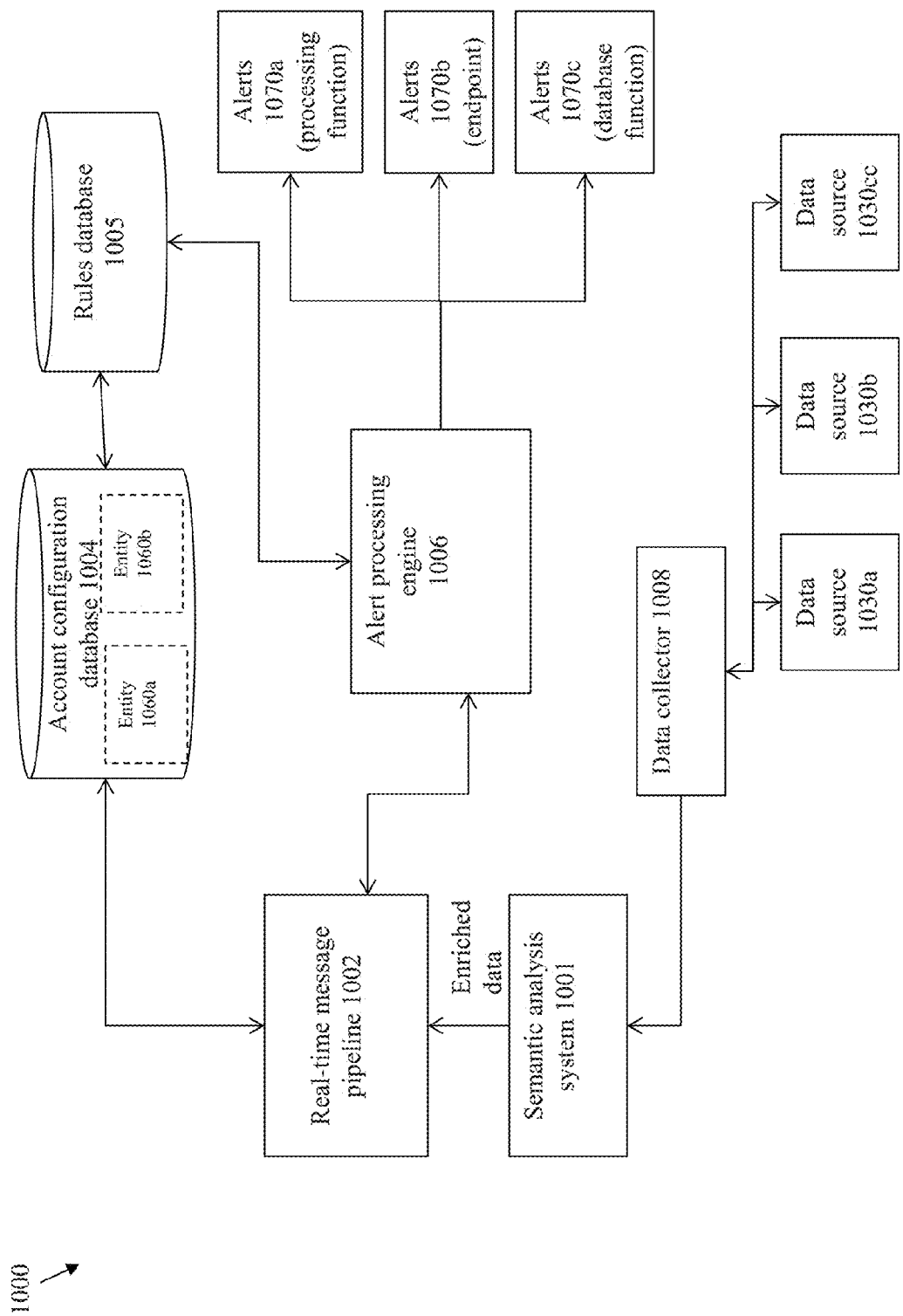
FIG. 10 illustrates a detailed system architecture of a rules-based routing approach for generating alerts.

Referring now to FIG. 10, a general system architecture 1000 representing the semantic analysis system and how alerts may be generated to various endpoints. As will be discussed in further detail below, the alerts engine may be configured to consult the alert rules and accordingly generate alerts at one or more endpoints in the form of messages (e.g., email, text, etc.) and/or processing or database functions performed at the semantic analysis system.

At the center of FIG. 10, is the semantic analysis system 1001 that takes data from various sources, and performs semantic analysis as described in the previous Figures. It should be appreciated that the various sub-components are omitted in FIG. 10 for simplicity, but the semantic analysis system 1001 may comprise all the components and/or additional components in various embodiments.

As shown in FIG. 10, the semantic analysis system 1001 receives data from multiple data sources (e.g., 1030a, 1030b, 1030n, etc.) Data coming from the various sources 1030 may be collected and/or aggregated by a data collector 1008 that aggregates the data for consumption by the semantic analysis system 1001. As discussed in detail above, the data sources 1030 may be public data or data associated with an entity (e.g., enterprise data, etc.) receiving directly from customers, in one or more embodiments.

As shown in FIG. 10, the enriched data (e.g., annotated data having the semantic analysis tags or semantically analyzed data or categorized data) from the semantic analysis system 1001 may be directed to a real-time message pipeline 1002 that comprises enriched data for all the topics created by one or more entities at the semantic analysis system 1001. In one or more embodiments, the real-time message pipeline 1002 comprises the results of the categorization process described above.

In one or more embodiments, an account configuration database 1004 may be consulted to determine how the categorized messages must be routed next. In some embodiments, the categorized messages may be directed routed to a designated database, such as a customer database dedicated to an entity (not shown). In other embodiments, if the categorized messages for a topic are to be generated as alerts, or are to be routed outside the semantic analysis system, a rules-based alerts engine and/or a routing rules engine may be consulted.

In one or more embodiments, the desired destination for the semantically analyzed messages may be stored in the configuration database 1004, which stores various parameters (e.g., topics, alert rules, routing rules, etc.) for one or more entities. Further, the account configuration database 1004 may store a set of preferences and/or payment details associated with the customer. In one or more embodiments, the real-time message pipeline 1002 may comprise a processing component that determines the topics related to a particular client by consulting the account configuration database 1004, and may direct the enriched data to the appropriate endpoint.

The account configuration database 1004 may comprise a table identifying various customers, topics created by each customer, a preferred endpoint of the customer, payment details, etc. In one or more embodiments, the preferred endpoint may simply be a database dedicated to the customer. In one or more embodiments, data from the real-time message pipelines 1002 may be periodically directed to the database 1050 by consulting the account configuration database. For example, a retrieval agent (not shown) may be configured to periodically (e.g., daily, hourly, weekly, etc.) access the account configuration database 1004, and retrieve any updates to the categorized messages for a particular topic associated with the customer.

As discussed above, if alert rules are associated with topics, the real-time message pipeline 1002 may forward the semantically analyzed messages to the alerts engine 1004, which may utilize a rules-based approach to generate alerts.

As shown in FIG. 10, the alerts engine 1004 may consult a rules database 1005 in order to generate alerts (e.g., messages delivered to endpoint, automatic processing function, etc.). The rules may be user-based or alert rules 1092 that define, for each topic, a set of parameters that triggers an alert. As discussed above, the alerts may be in the form of messages (1070*b*) delivered to users associated with the entity. Alerts may also refer to processing tasks that are triggered based on the alert rules (e.g., database function 1070*c*, processing function 1070*a*, scheduling function, etc.).

For example, a user (e.g., associated with a user) may define alert rules for a particular topic such that the user receives an email when a number of negative messages for the particular topic crosses a predefined threshold. Or, the user may define an alert rule such that the user receives a text message when the frequency of messages for a particular time period crosses a predefined threshold. In another embodiment, the user may define an alert rule such that a topic vector, and the messages associated with the topic vector are automatically moved to another database table (e.g., indicating higher priority, etc.).

In some embodiments, the alerts engine may work in conjunction with a separate rules engine that is configured to utilize rules-based routing to route semantically analyzed data to various external endpoints. In other embodiments, a single unified rules engine may be configured to consult all rules (e.g., routing rules as well as alert rules) and generate alerts and/or route messages based on the rules.

Figure 11:
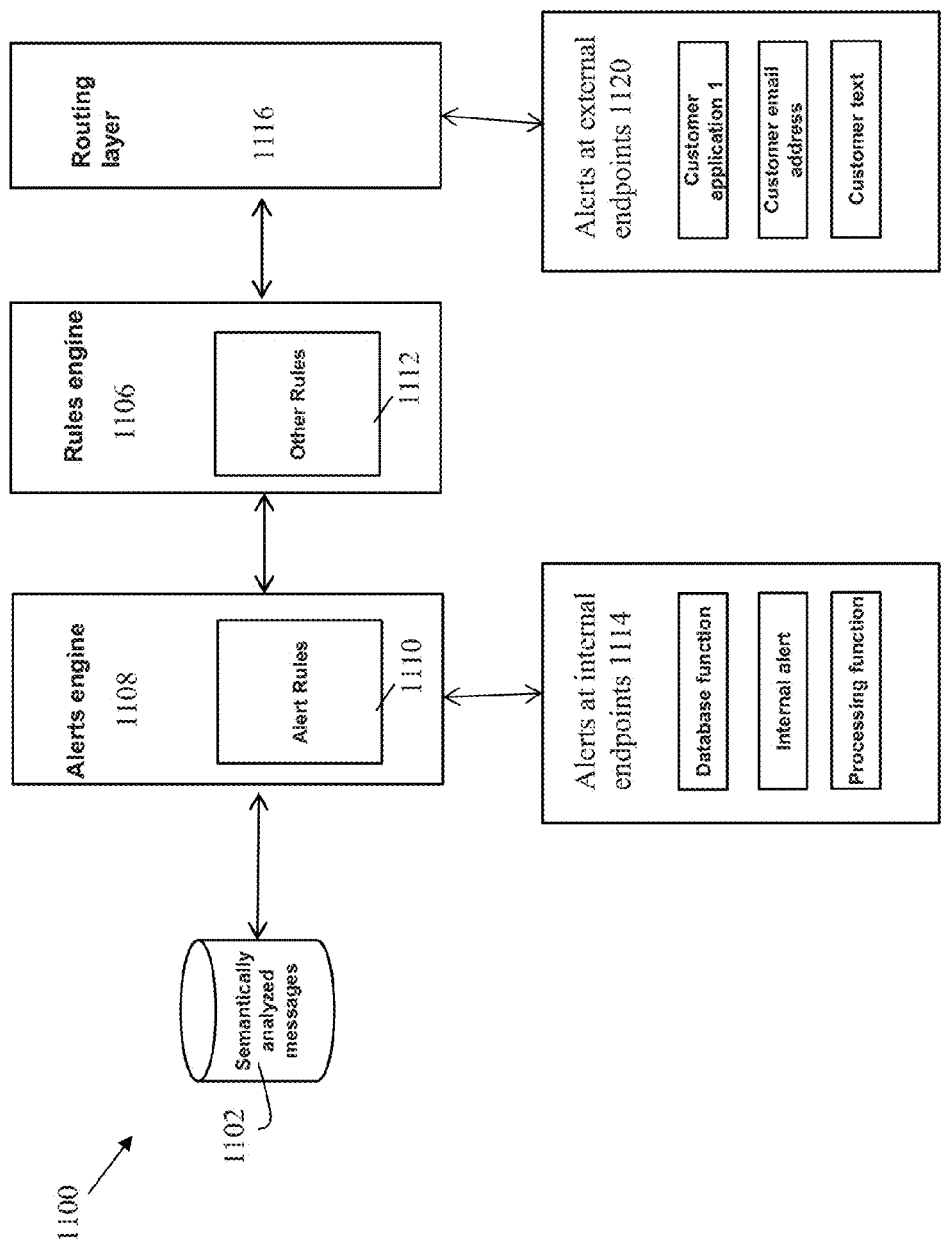
FIG. 11 illustrates an example system architecture of an alerts engine working in conjunction with a rules engine to generate alerts.

Referring now to the system architecture 1100 shown in FIG. 11, the semantically analyzed messages 1102 may be forwarded to the alerts engine 1110. The alerts engine may retrieve alert rules 1110 stored in the configuration database (not shown) and apply the alert rules to the semantically analyzed messages categorized by topic. In particular, the alerts engine may have a counting mechanism that counts a number of messages categorized for a particular topic that satisfy the set of alert rules, and generated alerts if the rules are satisfied.

In one or more embodiments, the if alerts are triggered, alerts may be generated at internal endpoints 1114. For example, the alert may trigger an action and/or message internally within the semantic analysis platform. As discussed above, the alert may trigger another function within the semantic analysis system. For example, the alert may cause a change at the database level, trigger a scheduled task, etc. Thus, the alerts engine 1114 may communicate with one or more processes within the semantic analysis system to cause predefined functions within the system. These functions may be defined in the alerts rules stored in the configuration database.

As shown in FIG. 11, the alerts engine may also work in conjunction with a rules engine 1106 that is configured to consult routing and/or compliance rules to route categorized messages to endpoints that are external to the semantic analysis system. For example, if the semantically analyzed messages and/or analysis is to be routed out of the semantic analysis system, additional rules may need to be satisfied before alerts can be generated at an email address associated with a customer entity. More information on compliance and routing rules will be provided further below. The rules engine 1106 may also retrieve the relevant compliance and/or routing rules from the configuration database.

Based on the rules, the rules engine 1106 may forward the semantically analyzed messages to a routing layer 1116 that is configured to route data from the semantic analysis system to desired endpoints 1120 that are external to the semantic analysis system. For example, the routing layer 1116 may cause an alert to be generated at an email address of a customer entity. Or, the routing layer 1116 may cause a text having the results of the semantic analysis and/or semantically analyzed messages to be generated at a customer's work phone, etc.

Figure 12:
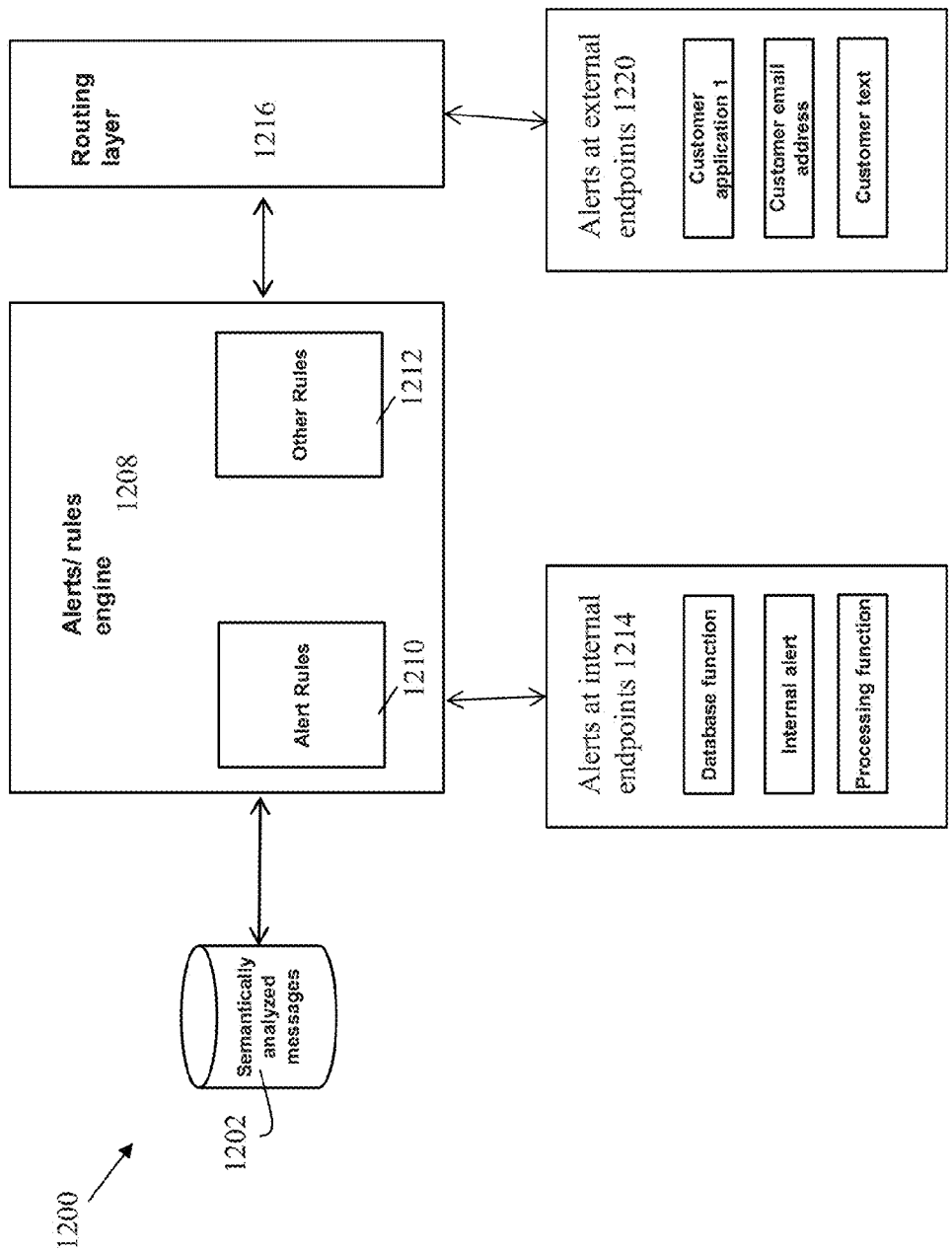
FIG. 12 illustrates an example system architecture of a common rules engine that generates alerts.

As discussed above, in some embodiments, the alerts engine and the rules engine may be consolidated into a single rules engine 1208 as shown in the system architecture 1200 of FIG. 12. The semantically analyzed messages 1202 may be forwarded to a common rules engine 1208 that consults both alert rules 1210 and other rules 1212 in order to generate alerts internally (1214) or generate alerts externally through a routing layer 1216 to various endpoints 1220.

Figure 13A:
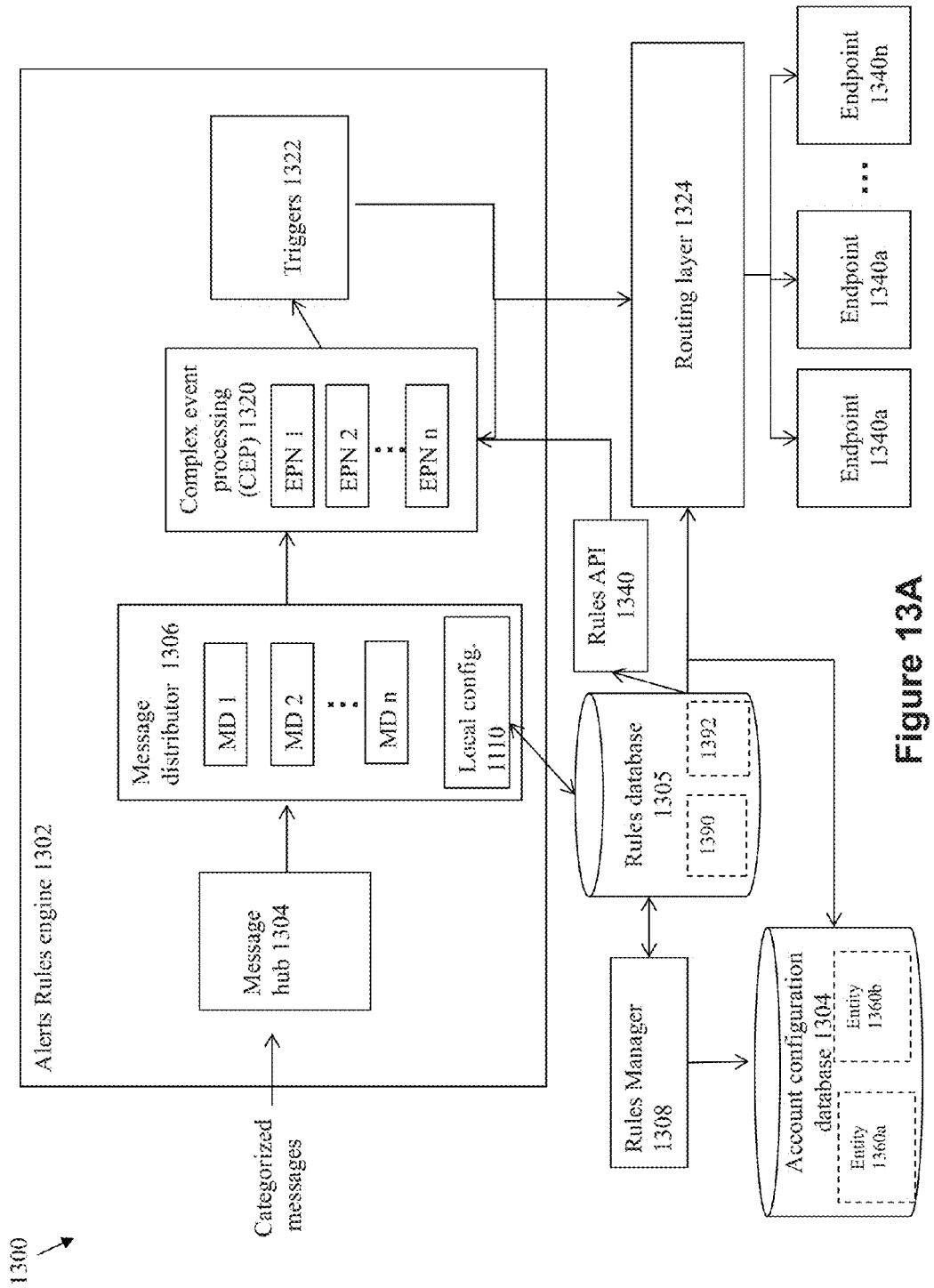
FIG. 13A illustrates a more detailed architecture of a rules engine.

Referring now to FIG. 13A, a more detailed architecture of the rules engine 1304 is provided. It will be assumed that the rules engine 1304 is a common rules engine, similar to the one illustrated in FIG. 12 (e.g., consults alert rules as well as routing and/or compliance rules to generate alerts and/or route data) for illustrative purposes only. Other embodiments may utilize a similar structure for a separate alerts engine and/or separate rules engine.

As shown in FIG. 13A, the rules engine 1302 receives categorized messages. For example, the categorized messages may be received from the real-time message pipeline 1002. In one or more embodiments, the categorized messages for various topics may be stored at a message hub 1304. The message hub 1304 may collect categorized messages that are periodically received (e.g., hourly, daily, weekly, etc.) from the real-time message pipeline 1002.

In one or more embodiments, messages (e.g., annotated messages, enriched messages) from the message hub 1304 may be sorted using a message distributor 1306. In one or more embodiments, the message distributors 1106 pull down the messages from the message hub 1304. It should be appreciated that there may be many message distributors (e.g., message distributor 1306*a*, message distributor 1306*b*, etc.) as shown in FIG. 13A.

As shown in FIG. 13, the message distributor 1306 may comprise a plurality of message distributor agents (e.g., MD1, MD2, etc.) that sort the messages based on particular topics. In one or more embodiments, each message distributor may be associated with predefined topics. For example, each topic may have an identification code, and topics having certain identification codes may automatically be directed to a particular message distributor.

In one or more embodiments, the rules database 1305 may be accessed by the message distributor agents to determine rules for the various created topics. A copy of the various rules (e.g., alert rules, compliance rules, routing rules, etc.) may be copied to a local configuration data 1310 stored in memory. This may allow the various message distributors to determine which topics are associated with rules, and pass on those topics for further processing.

Not all topics may be associated with rules. Thus, the message distributor agents 1306 may be configured to process only topics that are associated with rules, and disregard topics for which no rules have been defined. From a processing point of view, this sorting process greatly reduces a load on the system, and may positively affect the efficiency of processing.

In one or more embodiments, the rules database may be controlled by a rules manager 1308 that periodically retrieves rules and/or various parameters related to the rules. The rules manager 1308 may periodically retrieve rules from an account configuration database 1304, in some embodiments. To explain, a user associated with a particular customer, may have defined alert rules when configuring a topic. These rules may be stored in the account configuration database 1304. The rules manager 1308 may periodically (e.g., daily, weekly, etc.) retrieve rules from the account configuration database 1304 and store the rules in the rules database 1305. As discussed above, alert rules may define one or more parameters associated with a topic, and a threshold number of messages that trigger a particular alert rule.

In one or more embodiments, one or more thresholds may be defined for the alert rule. The thresholds define one or more characteristics of the categorized messages for a topic that trigger an alert. The threshold may refer to a number of messages having particular sentiment. In another embodiment, the threshold may refer to a number of messages originating from a particular source In yet another embodiment, the threhshold may refer to a change in a number of messages within a particular amount of time. For example, the threshold may define a number of messages within a particular period of time. In yet another embodiment, the threshold may refer to a change in a sentiment within a particular period of time. For example, if the overall sentiment for a topic goes from positive to negatve within a period of a day, an alert may be triggered.

Additionally, the rules manager 1308 may retrieve compliance rules from various sources and store them in the rules database 1305. Compliance rules may define a data source (e.g., a Twitter® message), and a type of customer application that the message can be routed to (e.g., cloud-based application, etc.).

The message distributors 1306 are also responsible for downloading enriched messages from the message hub and sending it to a complex event processing (CEP) mechanism 1320. The CEP mechanism 1320 comprises a plurality of event processing networks (EPNs) that process the messages for a topic against the rules for the topic. For example, if a particular topic is associated with an alert rule that says that if a number of negative sentiment messages exceeds 10,000, then send an alert, the CEP mechanism 1320 may count the number of messages to see if the rule has been triggered. If only 6,000 messages are triggered, the alert may not be triggered, and the CEP mechanism 1320 continues counting, or discards the data if the rule isn't triggered within the predefined time-frame. If, however, 10,001 messages are negative (within the predefined timeframe), a trigger 1322 may be generated by the CEP mechanism 1120. In one or more embodiments, the triggers 1322 may be directed to the routing layer 1324 to be routed to external endpoints.

As discussed above, the message distributor may send the message to the appropriate event processing network (EPN) hosting the topic associated with the particular message. Each message may be associated with one or more topics. Each message may be split into multiple messages for each topic T and sent to a kestrel queue for the EPN hosting the topic T. In one or more embodiments, the message distributor 1306 may further comprise a message hub client that downloads messages from the rules engine queue, and a message splitter that splits the messages per topic in order to send to the appropriate EPN.

As briefly discussed above, in one or more embodiments, the message distributor 1306 may periodically query the database (e.g., configuration database 1304) and pull various rule parameters (e.g., topic creation parameters, etc.) into the local cache configuration 1310. This local configuration data 1310 may be used in order to route messages to its designated EPN. In one or more embodiments, a mapping between the topics and designated EPNs for the various topics may be stored onto the local configuration data 3110. This information helps the message distributor distribute the set of messages to the right channel or EPN in the CEP mechanism 1320.

In one or more embodiments, the message distributors 1306 split the messages into multiple topic-specific messages. These messages are sent to respective EPNs (via the cache), each of the EPNs mapped to a topic or set of topics. If there are messages that do no map to any particular EPN, the message may be discarded (i.e. the messages are pushed for all rules running on EPN-N to kestrel "EPN-N" queue, on which EPN-N may be listening for events).

In one or more embodiments, the system may also comprise a set of input adapters (not shown). The input adapters may consolidate the set of messages from the message distributors prior to processing by the various EPNs. In one or more embodiments, the EPNs may be configured for pulling data from the input kestrel queue and processing messages based on the configured rules.

Once the messages have been processed, the EPN(s) may push the output events generated by the processor (i.e., EPN) to an output kestrel queue that may comprise the triggers 1322. The triggers 1322 may also contain a rule ID and a threshold of messages that triggered that rule. In one or more embodiments, the output triggers 1322 may also comprise other parameters (e.g., sentiment, frequency, etc.) as well.

In one or more embodiments, the system also comprises an event handler (not shown) configured to watch the output queue (triggers 1322) for output events, and take event-type based actions based on the message data, and the rules in the database. The event handler may communicate alerts via various pluggable adapters for various output channels or endpoints, such as email, text, messages, etc. For example, the user's email address and/or other personal information may be retrieved from the rules database or account configuration database to generate the alert at the right output channel.

On the rules creation side, a user of the system may create one or more rules on a user interface as discussed above. Example user interfaces that allow users to set preferences for alerts will be illustrated below. As discussed above, rules defined by the user for each topic may be stored in the account configuration database 1304, and the rules database 1305.

In one or more embodiments, the system may comprise a rules engine API 1340 that persists rule information in the rules engine database 1305. It provides endpoints to do create, read, update, delete (CRUD) operations on rules. In one or more embodiments, the rules manager 1308 is configured to periodically query the rules database 1305 for rule changes (e.g., new, enabled, disabled, modified, etc.) for topics and mark them for the EPNs to pick up. The rules manager 1308 may also determine which rule should be mapped to which EPN. In one or more embodiments, the rules manager 1308 may also generate Continuous Query Language (CQL) for the rules, which may, in turn, be picked up the EPNs. In other words, by generating the CQLs for the various rules, the rules are essentially formatted for consumption by the EPNs.

In addition to being responsible for rules addition, deletion and updates in the EPN, the rules manager 1308 may also determine which topic to run on which EPN. For all the newly added/changed rules, the rules manager 1308 may generate a new CQL in the rules database 1305 and mark the rule as to be picked by the EPN.

For rule addition, the rules manager 1308 may check if a particular topic is already associated with an EPN. If it is not already associated with an EPN, the rules manager 1308 may map the topic to an EPN, based on the last loaded EPN, and mark the added rule as to be picked up by EPN with action "add" for the EPN's rule adaptor's (which communicate the CQLs to the EPNs as described further below) pickup and processing.

For rule deletion, the rule may be marked as to be picked up the EPN with action "delete" for the EPN's rule adaptor pickup and processing. Similarly, for rule updates, the rule may be marked with action "update" for the EPN's rule adaptor's pickup and processing.

In one or more embodiments, an EPN may be manually assigned or reserved for one or more rules. For any special or highly important topic, a system administrator may intervene and assign a reserved EPN for a rule. For topics that are already running, the rules of the topic may be marked so that the current EPN deletes it from its configuration. This step may be optional, and may only be used when cleaning out the old EPN rules and views.

The topic-EPN association may be changed for the topic to map it to the newly reserved EPN. Subsequently, the rules may be marked for this topic as add and change the "ToBePickedByEPN" tag as true for all rules of that EPN. In this manner, the rules manager 1308 communicates with the various EPNs to add, delete, update, rules, among other functions. Various rule adaptors (not shown) enable this communication.

The rule adaptors may be thought of as a link between the message processing and the rules processing. The rule adaptors are configured to periodically poll the rules database 1305 for rule changes associated with a particular EPN, and create, update, delete, activate, and/or deactivate the rule inside the CQL processor associated with the particular EPN.

Coming back to the processing of messages by the EPN, the messages pulled from the input kestrel queue may be split into multiple snippets. It should be appreciated that the input kestrel queue comprises semantically categorized messages. A UnionView may be the union of all the messages pulled down by the input adaptors. Or, a topic view may be used for messages corresponding to particular topic ID. Union views and topic views may be used for EPN message aggregation. A union view is the union of all messages (i.e., of multiple topics coming from multiple input adaptors) for an EPN, whereas a topic view is used for topic-level aggregations.

As described in some detail above, the EPNs may receive the CQLS from the rules manager 1308. The EPNs may utilize multiple views for aggregation queries or run other queries based on the received input and the CQLs in order to generate events. As discussed above, events generated by the rules query may be fed into output channels which push the triggers 1322 to be handled by the routing layer 1324.

In one or more embodiments, the routing layer 1324 may comprise an event handler. The event handler may take appropriate actions on the event (e.g., use text message information present in the event itself, query for email ID of the customer from the rules database, etc.). There may be various event adaptors for different event types (e.g., email, text messages, audio message, video message, etc.) that are pluggable in the output event handler. These event adaptors may take some action based on the output type of the generated event (e.g., alerts through text message, email, audio communication, video communication, social media message, etc.). It should be appreciated that this type of design does not require an EPN change when adding a new action at the event handler.

In addition to user-specific alert rules, the rules engine 1302 may be utilized in order to route messages based on compliance rules. If a message within a topic is associated with a compliance rule (e.g., based on the data source, and the desired endpoint), the message may be withheld from routing. In particular, the message distributor agents 1306 may identify the messages associated with the compliance rule and send the messages to the CEP mechanism 1320. In some embodiments, the CEP mechanism 1320 may perform the necessary processing tasks associated with the rule (e.g., track the message associated with the data source, delete the message from the remaining messages associated with the topic, etc.). This new set of messages may then be directed to the routing layer 1324.

In one or more embodiments, the routing layer 1324 may consult the account configuration database 1304 to retrieve a set of data related to the desired endpoints for the set of enriched data. Additionally, routing rules may be retrieved from the account configuration database 1304 to determine any applicable routing thresholds of the endpoint.

For example, assuming that messages associated with a topic are to be sent to a cloud application, the routing layer 1324 may retrieve a destination address from the account configuration database 1324, which stores a set of data defined by the user during set-up. Assuming that no routing rules are violated, the routing layer 1324 may deliver the messages associated with the topic to the cloud application, or a destination within the cloud application (e.g., a user's email address).

Figure 13B:
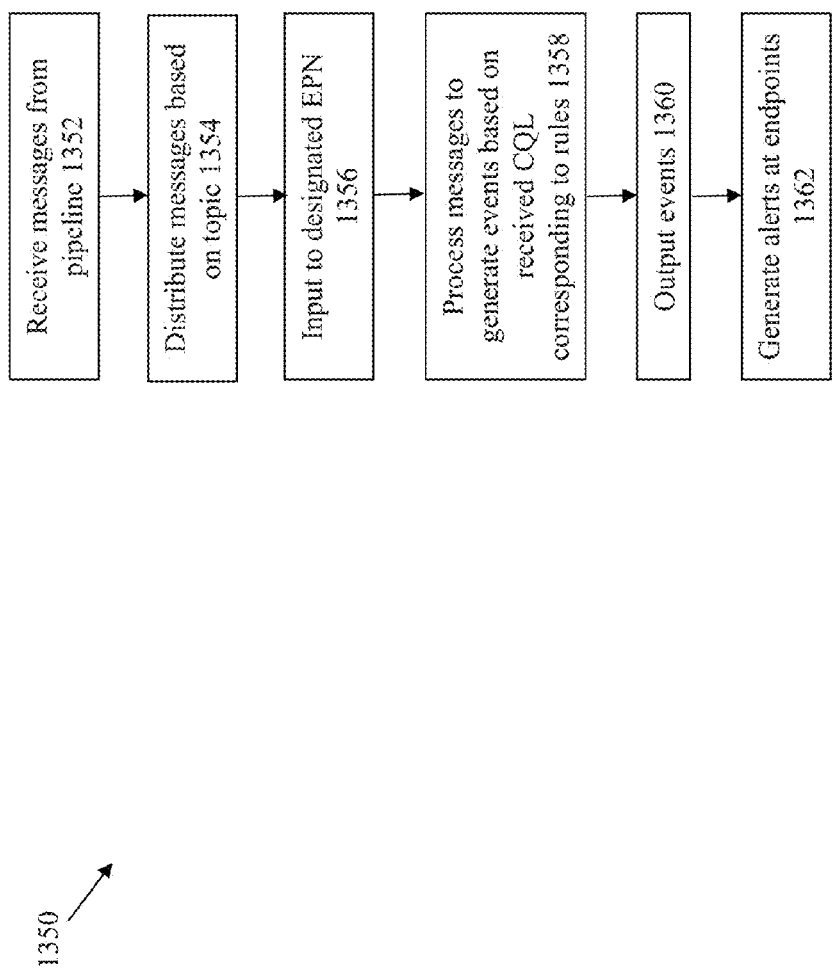
FIG. 13B illustrates a flowchart of an approach for using the rules engine of FIG. 13A to generate alerts according to some embodiments of the invention

Referring now to FIG. 13B an example process flow 1350 of processing messages in the rules engines is illustrated. At 1352, messages are received from the pipeline. At 1354, messages are distributed, through the message distributors based on the topic of the messages. The message distributors access the local configuration store to determine topics, in one or more embodiments. At 1356, the messages are inputted into designated EPNs. The EPNs are updated with rules and their associated CQLs from the rules manager 1308 through a rules adaptor.

At 1358, the messages are processed at the designated EPN to generate events. At 1360, any generated events are outputted, and the event handler may send out the events (i.e., alerts) to their respective endpoints (or output channels) (1362).

As discussed above, compliance rules and/or routing rules may be applied to the semantically analyzed messages. For example, there may be compliance rules that require tracking of data acquired from particular data sources (e.g., a social media source). In another example, there may be compliance rules that prohibit routing of data derived from social media sources to on-premise customer applications. It should be appreciated that many social media websites (e.g., Twitter®) require that publicly available data be routed only to cloud-based applications, and not on-premise customer applications. Therefore, if such a rule applies (e.g., based on the desired endpoint and/or the data source), the rules engine 1302 may route only the analysis of the data to the on-premise customer application and not route the messages themselves (e.g., Twitter® messages) to the on-premise customer application.

Similarly, routing rules may apply when routing enriched data externally. For example, routing thresholds may be enforced for one or endpoints. The routing thresholds define a maximum amount of data that may be transmitted to the receiving application at any given time. Similarly, other routing rules specific to the endpoint customer application or endpoint may need to be consulted before routing the data to the desired endpoint.

Figure 14:
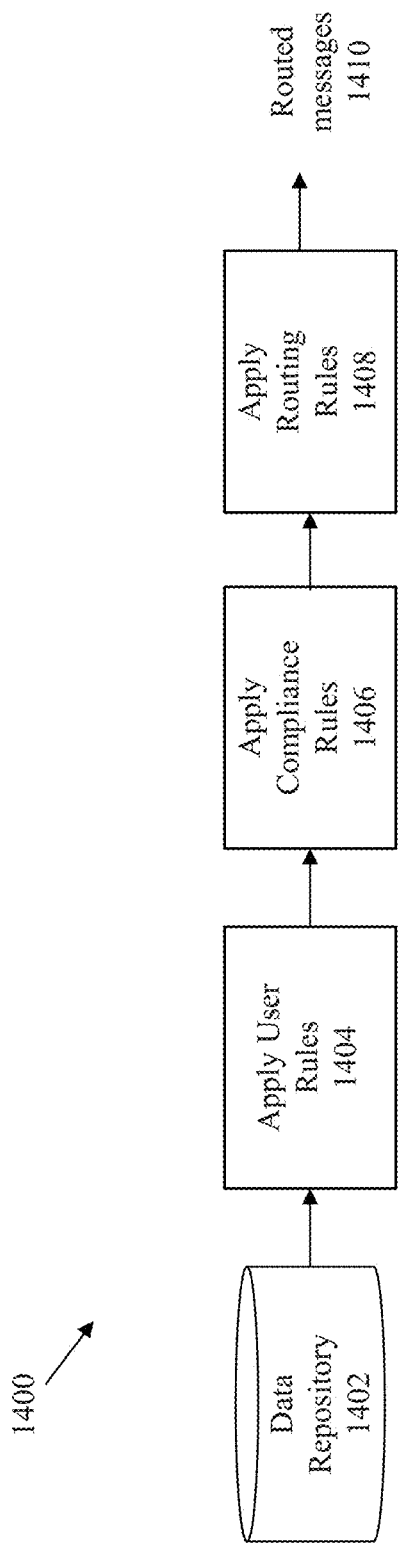
FIG. 14 illustrates an approach that can be taken to implement some embodiments of this invention(s).

Referring now to FIG. 14, an approach 1400 that can be taken to implement some embodiments of this invention(s) is illustrated. Data repository 1402 comprises the data to be processed by the rules-based system. In one or more embodiments, the data repository 1402 refers to the real-time message pipeline that comprises enriched data for all customers and all topics. In other embodiments, the data repository 1402 may refer to enriched data that has already been directed to the rules engine 1004, as shown in FIG. 10.

In some embodiments, the data repository 1402 is a common repository (e.g., a common social repository) having content from multiple sources. By running automated rules against a common repository, the solution provides customers with greater options to select relevant content where various data sources intersect (e.g., traditional, proprietary, social enriched with metadata derived from internal IP and from $3^{rd}$ parties). In some embodiments, the data can be maintained in separate repositories.

At 1404, the system applies rules to the data in the repository. The rules may be user-defined rules that are provided by the user/customer for processing the content. In addition to, or instead of the user rules, system provided rules can be used to handle certain/default situations. In one or more embodiments, the user-defined rules may be alert rules.

Figure 15A:
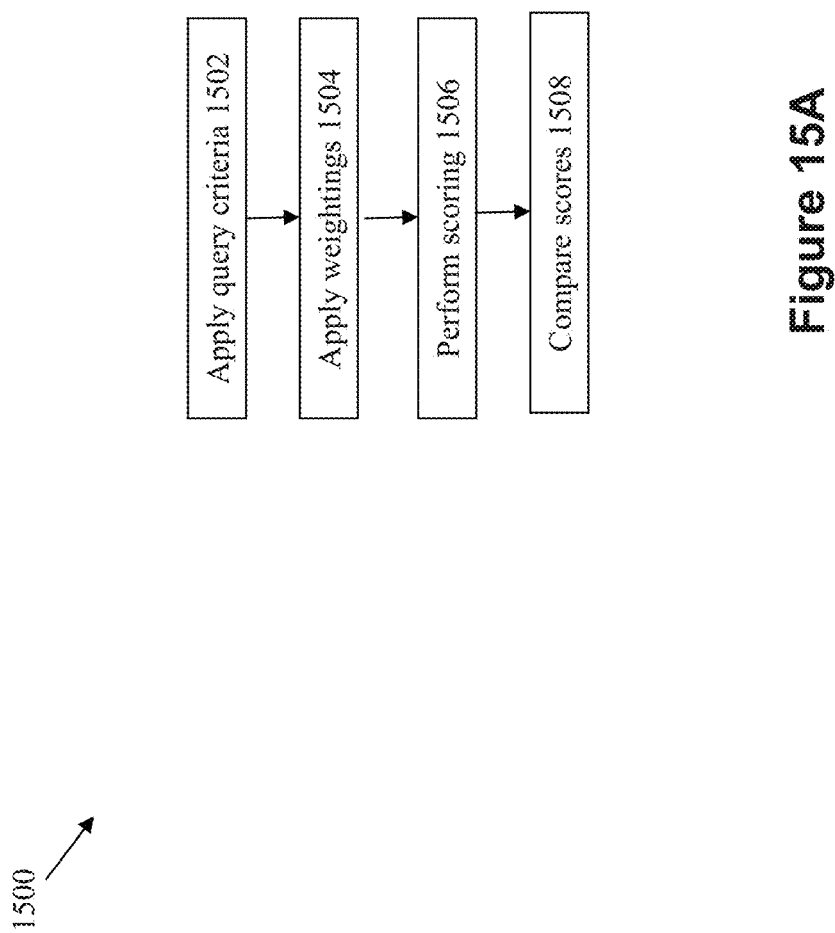
FIG. 15A shows a flowchart that provides more details of an example approach to apply user rules to the data.

FIG. 15A shows a flowchart 1500 that provides more details of an example approach to apply user rules to the data. At 1502, a query criteria is applied to the sources within the repository. The query criteria may include, for example, indicators, terms, subjectivity, and/or readability criteria. In addition, the query may pertain to socially enriched data from $3^{rd}$ parties (e.g., Klout® score, sentiment, entities, categories, tags, classification, etc.). Moreover, the query may pertain to demographics derived from multiple sources (such as company, position, income, gender, location, language, time zone).

Next, at 1504, user-defined weightings are applied to the posting criteria. The weightings are used to determine the relative importance of the criteria. For example, users can weigh the criteria so that "Customer Indicator" has more importance than sentiment, or so that manual trigger (manual identification of message status/processing) is more important than all other criteria.

At 1506, scoring is performed. In one or more embodiments, the scoring may be based (at least in part) on the criteria and the weightings. At 1508, the score is reviewed against the user defined rule(s) to evaluate if the post is a candidate for routing. For example, a counting mechanism may be implemented to count a number of messages having the defined criteria (e.g., negative sentiment). If the number of messages crosses a defined threshold, the set of messages and/or analysis of the messages may be routed to an endpoint. In some embodiments, the user rules may be alert rules, as described with reference to FIGS. 10 and 13.

Figure 15B:
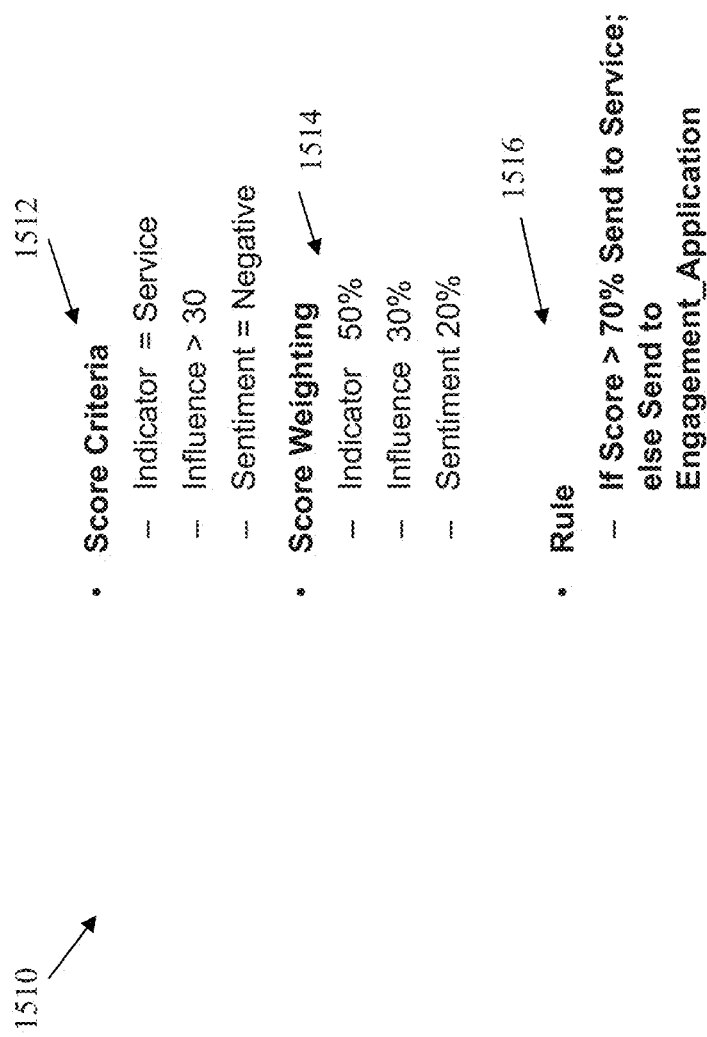
FIG. 15B is an example of how this type of scoring and rules handling can be applied to a message.

FIG. 15B is an example 1510 of how this type of scoring and rules handling can be applied to a message. Here, the various criteria 1512 are identified and have been applied to a message. In addition, relative weights 1514 have been assigned to various criteria. The user rules 1516 are then evaluated against the score, with an indication of whether the message should be routed to a department within the organization (e.g., route to Service department if score is over 70%) or sent for further handling at another point (e.g., send to an engagement software application if not over 70%).

Returning back to FIG. 14, the next action at 1406 is to apply compliance rules to the data content. This step provides built-in compliance with any rules that may have been established that needs to be followed for contractual or legal compliance. This is because various social sites or data provider agreements specify the circumstances under which data may or may not be provided to certain kinds of endpoints. For example, certain social sites have data provider contractual terms which restrict data from those sites from being sent to on-premise applications, while permitting that data to be sent to off-premise cloud applications. Therefore, to ensure compliance with these legal requirements, compliance rules can be implemented and applied to the data content to check whether the endpoint is an on-premise or off-premise endpoint.

Figure 16:
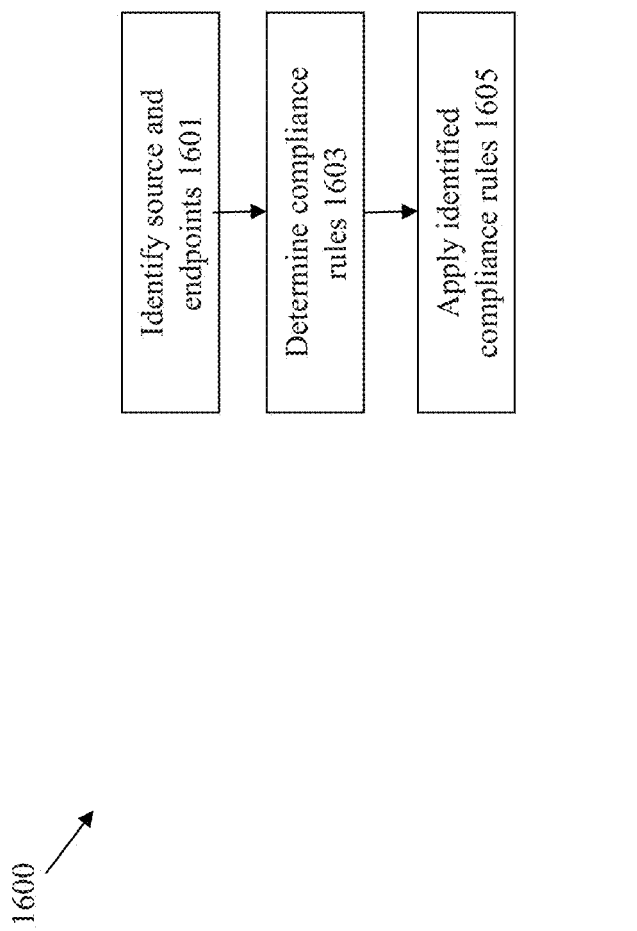
FIG. 16 shows an approach for applying compliance rules the data content.

FIG. 16 shows an approach 1600 for applying compliance rules the data content. At 1601, the process identifies the relevant data source(s) and endpoint(s) for the content. This action essentially determines where the data is coming from, and where it is expected to be sent to. Next, at 1603, a determination is made of the specific compliance rules that are to be applied. This determination is made based at least in part on the source of the data (e.g., whether it is owned, public, and/or proprietary such as company hosted source). In addition, a determination is made of the routing endpoint type (e.g., whether the endpoint is a cloud-based endpoint or an on-premise endpoint, etc.).

At 1605, the identified compliance rule(s) is then applied to the data. This may be implemented by selecting/populating the canonical (message/content) with the allowed data. In addition, plug-ins may be applied if applicable (either internal or from a data provider). This pertains to the situation where the data provider may have a plug-in that permits the data to be viewed even if it cannot be natively provided to an endpoint.

Returning back to FIG. 14, the next action at 1408 is to apply routing rules to the data content. A common data delivery layer is used to route relevant and compliant content to one or many endpoints by evaluating endpoint, control attributes and thresholds.

Figure 17:
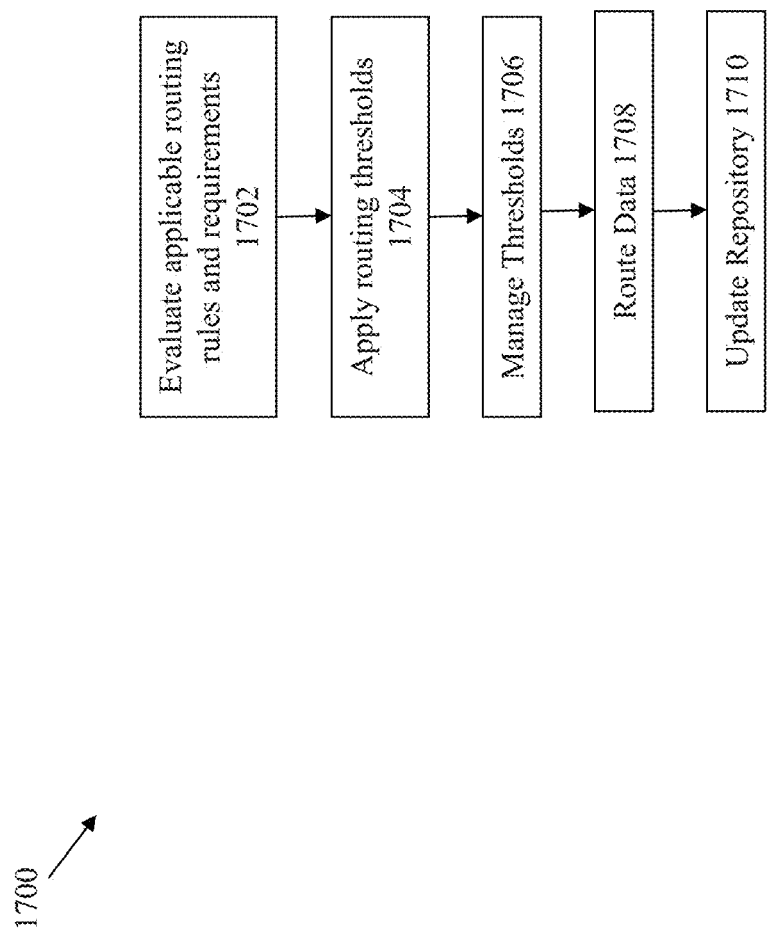
FIG. 17 shows a flowchart of an approach to apply routing rules according to some embodiments of the invention(s).

FIG. 17 shows a flowchart 1700 of an approach to apply routing rules according to some embodiments of the invention(s). At 1702, the applicable routing rule(s) are evaluated relative to the content. This evaluation may also take into account other items of information such as the content priority (e.g., whether alerts have a relatively high priority), data latency requirements, and/or whether the endpoint has selected the type of data transport (e.g., push vs. pull).

At 1704, routing thresholds may be applied, for example, that determine the quantity/throughput of data that can be handled by the endpoint. At 1706, thresholds are managed for the endpoints. This is performed, for example, to manage threshold overages for the endpoint so that (a) the endpoint is not overloaded and (b) no data is lost by the threshold overage.

Next, at 1708, the data is routed via the selected method. The rules can establish the exact endpoint to which the message is routed, including on-premise endpoints, off-premise endpoints, and specific departments within the organization to receive the message. At 1710, the repository can be updated with the selected routing activity.

Figure 18:
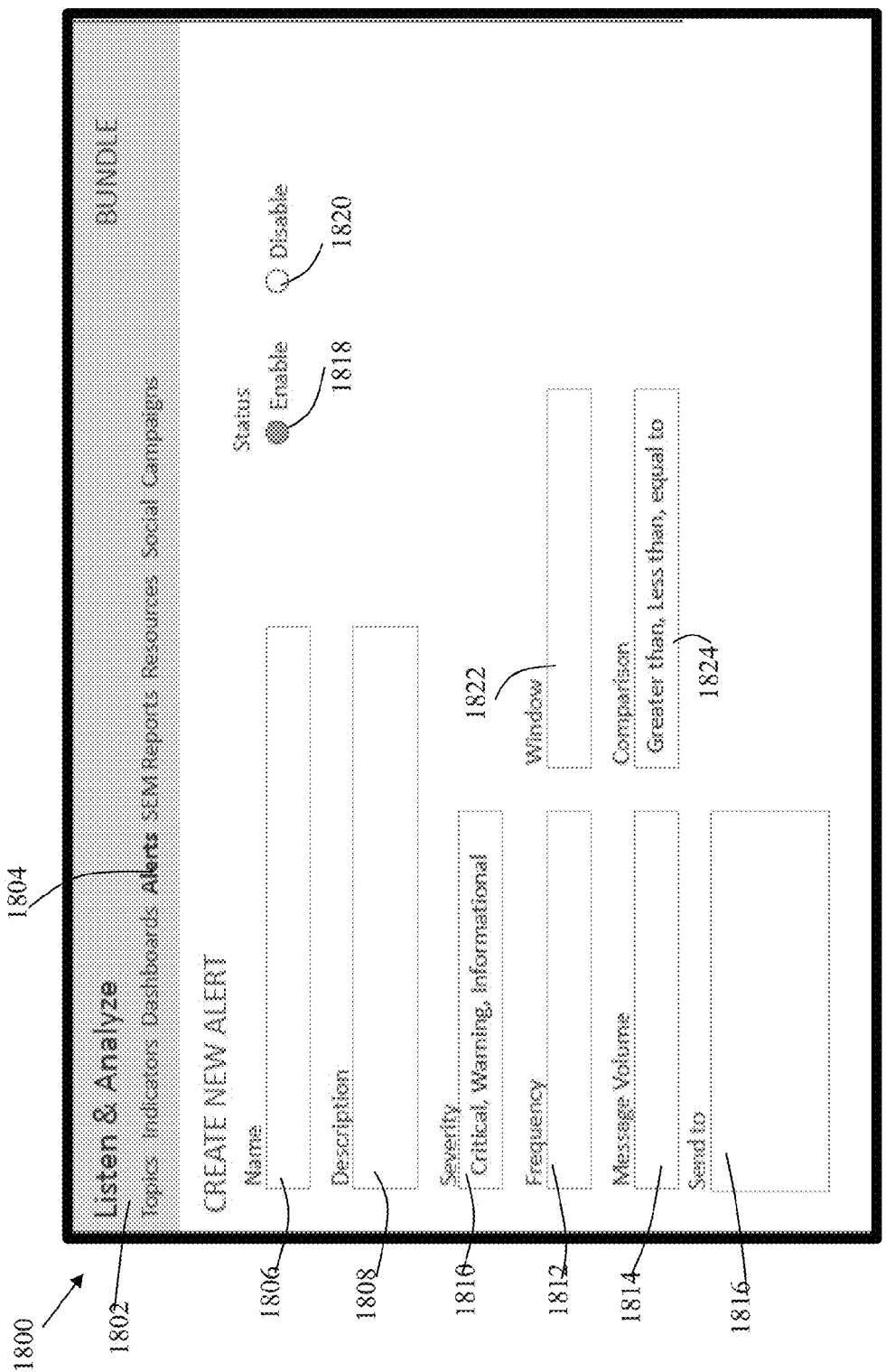
FIG. 18 shows an example user interface that may be used to define a set of rules pertaining to alerts according to some embodiments of the invention.

Referring now to FIG. 18, an example user interface for defining rules is provided. In one or more embodiments, a rule definition user interface 1800 may be provided to a user to allow a user to define a set of rules pertaining to alerts. The set of rules are created for one or more topics, and they define parameters as to when to generate alerts based on the nature of categorized messages. The rules definition user interface 1800 may be a tab 1802 on a larger user interface that allows the user to set up a topic, dashboard, etc., as shown in FIG. 18. The rules definition user interface 1800 may be generated when the alerts tab 1804 is actuated by the user. It should be appreciated that in other embodiments, the rules set up screen may be separate from the topic creation set up screen. Other embodiments may bring up the rules definition user interface 1800 as a pop-up window, embedded screen, or using other well-known user interface techniques.

In the illustrated embodiment, the alerts tab 1804 allows the user to create a new alert. A name of the alert may be defined in the name field 1806. A description of the alert may be entered in the description field 1808. This may allow the user to view why the alert was created, and the user may enter notes on the alert, in some cases. The severity field 1810 may allow the user to select a severity or importance of the alert. In one or more embodiments, the user may simply enter in values, as shown in the illustrated embodiment. Other embodiments may comprise selection controls (e.g., buttons, drop-down menu, etc.).

The severity of the alert may help the system prioritize the alert, and/or may affect the EPN for the particular topic, in some cases. For importance of the alert may also be important when generating the alert itself. For example, when a critical alert is generated, the emaiUtext/audio/video/social media message, etc. may be marked as critical, urging immediate attention. Or, when an information alert is generated, the user may simply be notified of a particular trend, but may not warrant any special action.

In one or more embodiments, the frequency field 1812 may allow the user to define a frequency at which to check for a threshold number of messages pertaining to a topic. For example, the frequency may be any time period (e.g., 10 minutes, 20 minutes, 30 minutes, 1 day, etc.). If the threshold is met, the frequency may also refer to how often alerts continue to be generated.

The window field 1822 defines how far back the messages are checked to see if a threshold number of messages pertaining to a topic has been reached (e.g., 1 hour, 2 hour, daily, etc.). Thus, rather than being flooded by alert messages, this allows the user to set the window of time within which to evaluate the set of messages.

The message volume field 1814 allows the user to define a threshold volume of messages at which to generate a particular alert. For example, if the message volume is defined as "10,000" and the frequency is set to "10 minutes," an alert will be generated only if 10,000 messages have been collected within the last 10 minutes.

The send to field 1816 allows the user who receives the alerts. The send to field 1816 may be filled with email addresses, phone numbers, social media identifiers, etc. The comparison field 1824 may also be used to generate alerts when a number of messages reaches a number greater than, less than or equal to another topic, for example. Similarly, other embodiments may comprise other parameters to define alerts. For example, a volume change parameter may be included such that an alert is only generated when a change in the volume of messages crosses a particular threshold. This may provide a more accurate picture for some businesses, especially those that are frequently discussed in social media.

The rules definition user interface 1800 may further comprise selection controls 1818 and 1820 that the user may actuate to enable or disable a particular alert. For example, some alerts may be enabled at particular times of the year (e.g., close to product release, holidays, etc.), and may be similarly disabled when not especially relevant.

Figure 19:
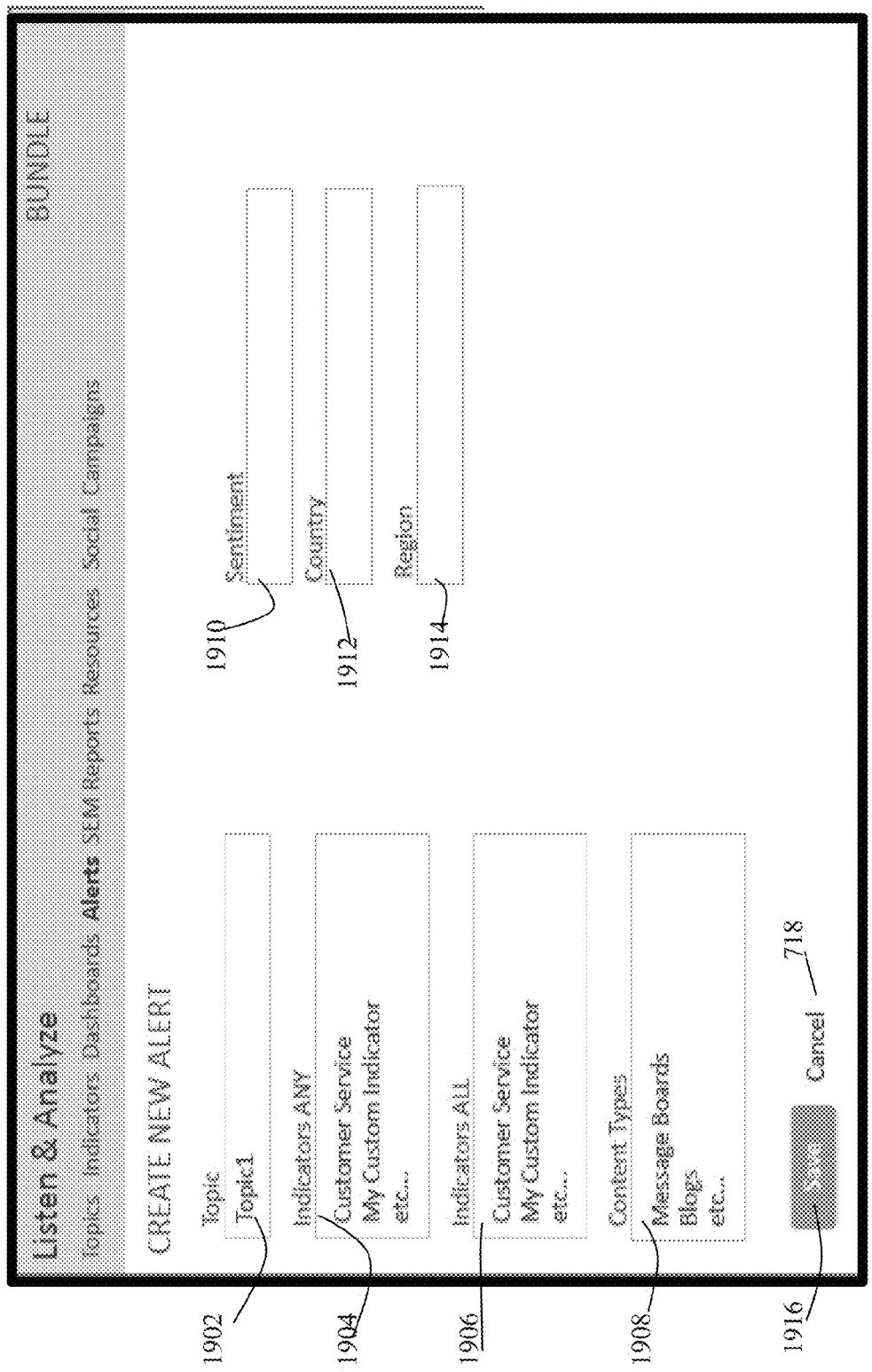
FIG. 19 shows another example user interface that may be used to define a set of rules for a created topic pertaining to alerts according to some embodiments of the invention.

Referring now to FIG. 19, another user interface for defining rules pertaining to alerts is presented. In one or more embodiments, the set of rules are linked to one or more topics created by the topic creation mechanism. The user interface may include a topic field 1902 to allow a user to define a particular topic. In one or more embodiments, the user may simply enter a previously created topic. In other embodiment, the field 1902 may comprise a drop down menu comprising all the topics created by the user and allow the user to select at least one topic for which to create the alert.

In one or more embodiments, fields 1904 and 1906 may be used to include any (1904) or all (1906) indicators for the particular topic. The user interface may also include a content type field 1908 that allows a user to select a content type, if desired. For example, an alert may only be generated if messages originate from message boards. Or, an alert may only be generated if a topic is trending (i.e., reaches a threshold number) on social media. Thus, rules may be defined such that alerts are generated only when messages at a source of interest reach a particular threshold.

The user interface may further include a sentiment field 1910 to allow a user to select a particular sentiment (e.g., positive, negative, neutral, etc.). For example, the user may only be alerted based on a threshold number of negative messages. This allows the user to understand the nature of messages surrounding a particular situation and react accordingly (e.g., a flurry of negative comments may require the business to act more urgently whereas positive comments may not necessarily require urgent action).

The user interface may also include fields 1912 and 1914 to define a country and/or region from which the messages originate. More than one country or region may be selected.

For example, the user may limit the alert rules such that an alert is only generated when the number of messages coming from a particular country reaches a threshold. Or, the user may only be interested in messages coming from a particular region (e.g., city, state, etc.).

Figure 20:
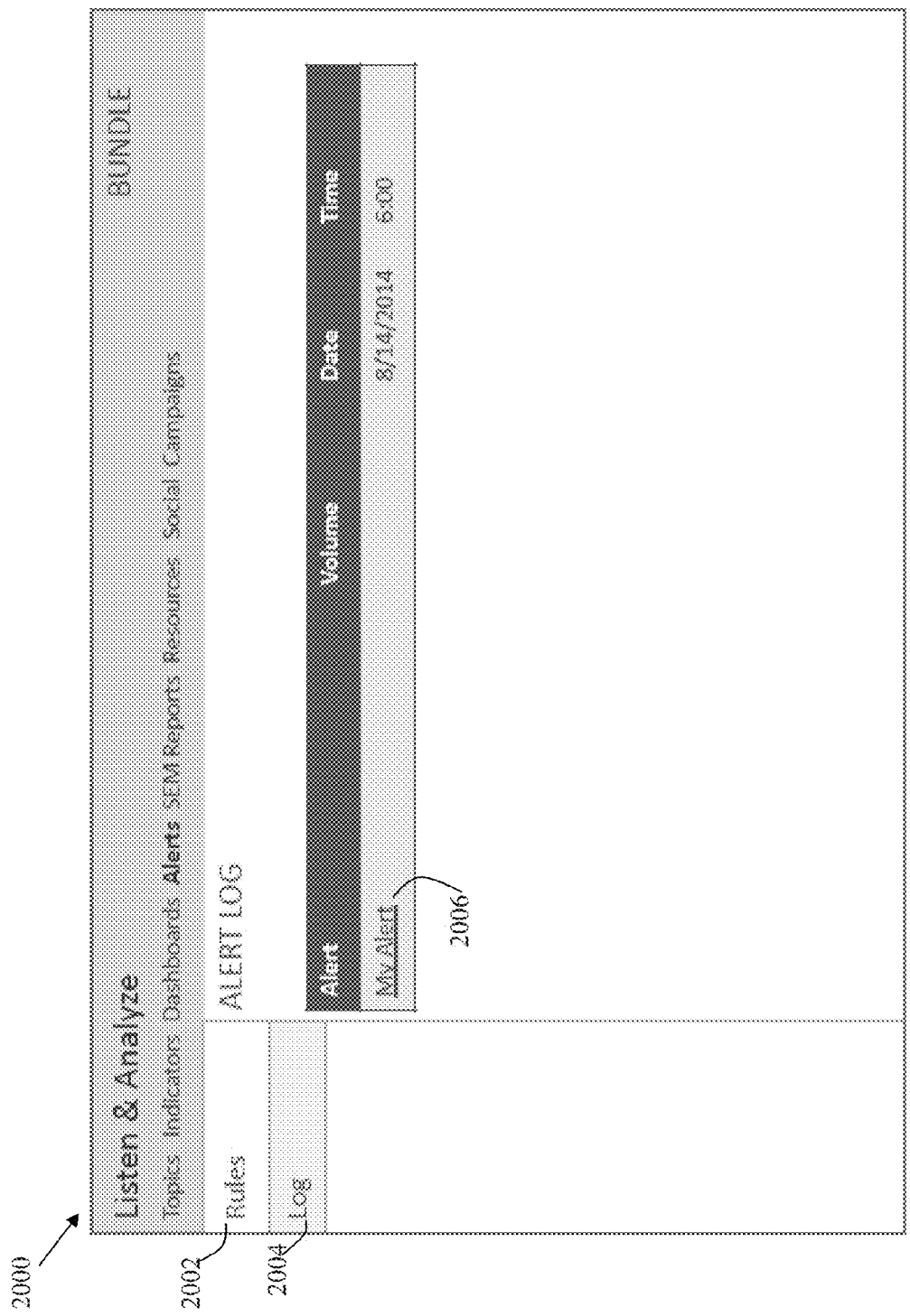
FIG. 20 shows an example user interface of an alert log, according to some embodiments of the invention.

Referring now to FIG. 20, an alert log user interface 2000 is presented. The alert log may be accessed by actuating a log tab 2004 from the topic creation dashboard. The alert log provides a log of created logs and allows the user to add new alerts, delete alerts or modify existing alerts. The log comprises individual alerts 2006 that may be viewed in more detail by actuating a desired alert. The alert log may be used to view a set of parameters set for each alert, history of various alerts, a list of email addresses to which alerts were sent to, etc.

Figure 21:
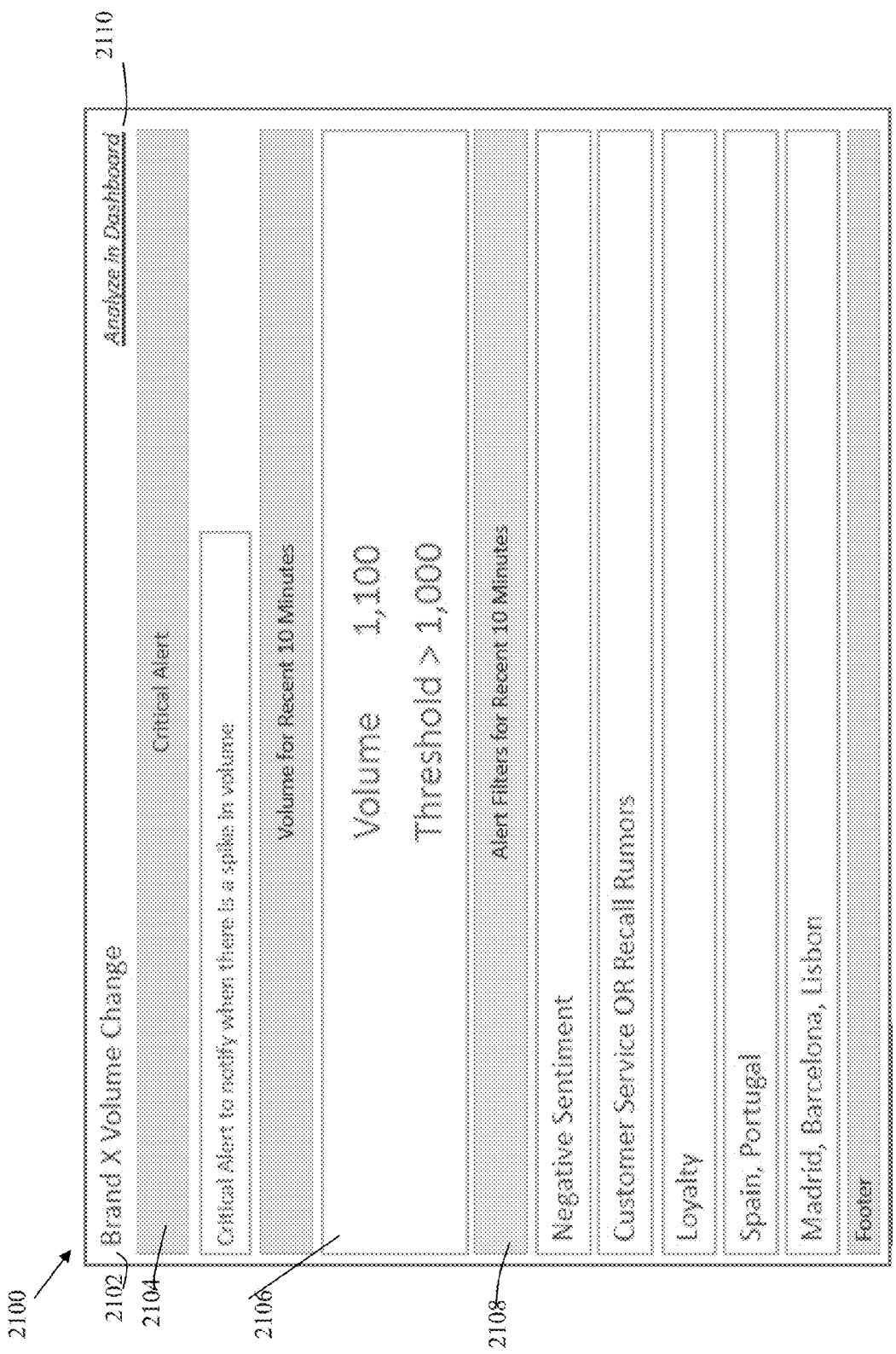
FIG. 21 shows an example user interface of an alert email, according to some embodiments of the invention.

Referring now to FIG. 21, an example email alert 2100 is presented. In one or more embodiments, the alert 2100 may comprise a subject 2102 indicating the name of the alert. The email may also indicate a severity or urgency 2104 of the alert. In the illustrated embodiment, the severity is shown to be critical. The contents of the email may further include the number of messages, and the threshold number set as per the rules for the alert, as displayed in the body of the email in portion 2106. The email body may further display the various alert filters set for the messages in portion 2108. The alert filters provide the user with a better sense of the type of messages that have been collected within the defined time period. As discussed above, the alert filters may enable users to set additional limitations on the collected messages. For example, the user may desire an alert only when a number of negative messages crosses a threshold value. Or, the user may desire an alert only when a number of messages originating from a particular threshold crosses a threshold value. In one or more embodiments, an embedded link 2110 to the analysis dashboard may be actuated to be taken to the rules creation user interfaces to analyze the data in further detail.

Figure 22:
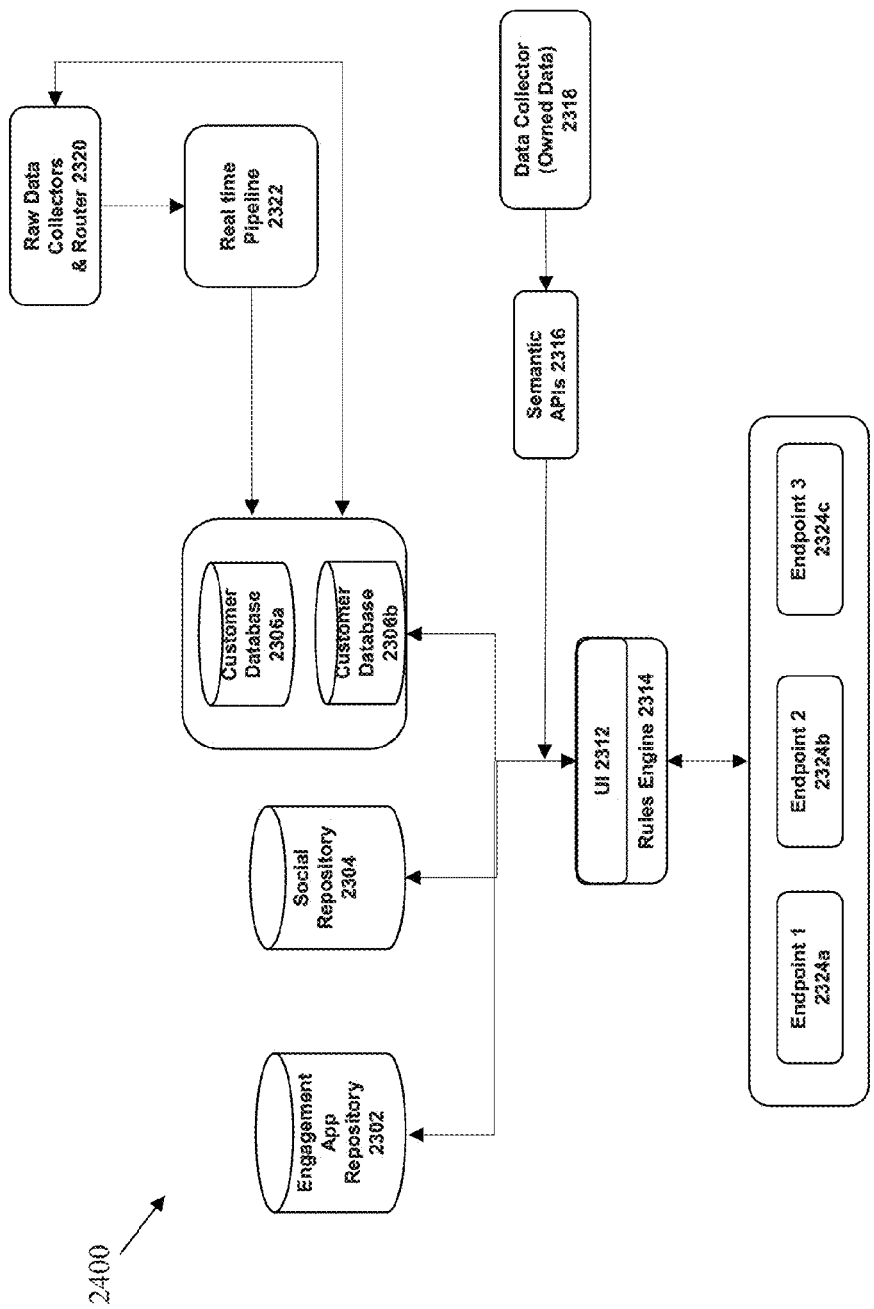
FIG. 22 illustrates an example architecture of the semantic analysis system m according to some embodiments of the invention.

FIG. 22 illustrates an example architecture 2300 according to some embodiments of the invention(s). This architecture includes multiple different data repositories for the data content to be processed by the system, including a social data repository 2304, a repository maintained for engagement application 2302, and a customer entity database (e.g., customer database 2306a, 2306b, etc.). As described in detail above, data from the real-time pipeline may be stored in respective customer entity databases 2306, based on preferences set by the customer.

Figure 23:
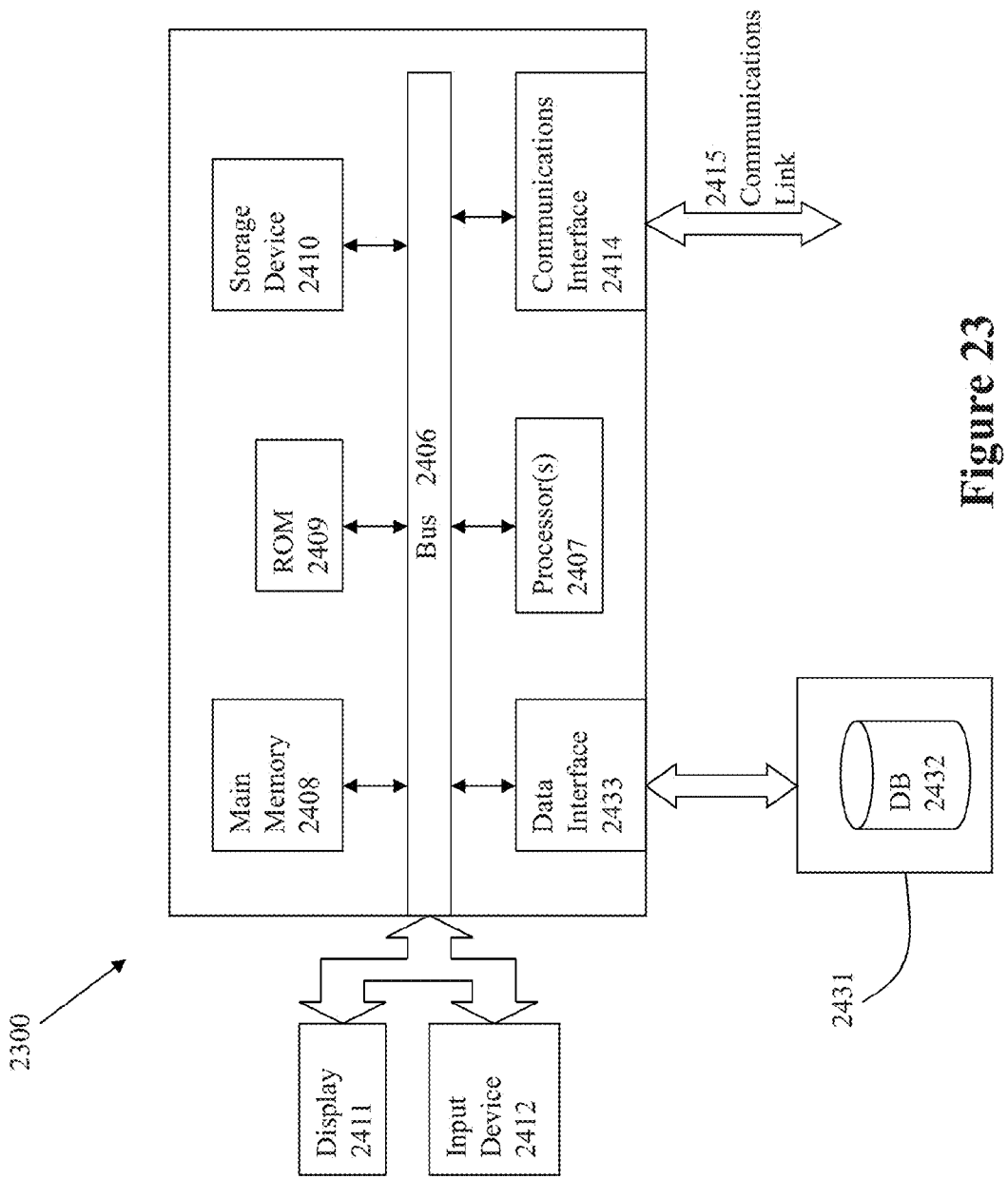
FIG. 23 depicts a computerized system on which an embodiment of the invention can be implemented.

A rules engine 2314 is provided in the architecture to route data to various endpoints (e.g., 2324a, 2324b, 2324c, etc.) based at least in part on user defined rules. The rules engine 2314 may receive rules through a user interface 2312. As shown in FIG. 23, another endpoint of the real-time pipeline 2322 is the dedicated customer entity database 2306.

A semantic/enrichment API 2316 may be used to interface with this system, providing enterprise data or owned data 2318 for analysis, and receiving enriched data back to the requesting entity through the semantic API 2316. Therefore, what has been described is a system, method, and computer program product for allowing an entity to perform semantic analysis upon private data possessed by an enterprise, and to automatically perform categorization of that data for processing within the enterprise. A semantic API can be provided to allow the enterprise to provide the private data to a sematic analysis system, even when the semantic analysis system is configured as a multi-tenant system that handles other items of public or private data. A rules-based routing architecture may be provided to facilitate analysis and routing of analyzed messages to the appropriate destination within the organization.

System Architecture Overview

FIG. 23 is a block diagram of an illustrative computing system 2400 suitable for implementing an embodiment of the present invention. Computer system 2400 includes a bus 2406 or other communication mechanism for communicating information, which interconnects subsystems and devices, such as processor 2407, system memory 2408 (e.g., RAM), static storage device 2409 (e.g., ROM), disk drive 2410 (e.g., magnetic or optical), communication interface 2414 (e.g., modem or Ethernet card), display 2411 (e.g., CRT or LCD), input device 2412 (e.g., keyboard), and cursor control.

According to one embodiment of the invention, computer system 2400 performs specific operations by processor 2407 executing one or more sequences of one or more instructions contained in system memory 2408. Such instructions may be read into system memory 2408 from another computer readable/usable medium, such as static storage device 2409 or disk drive 2410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Any usable medium can be used to participate in providing instructions to processor 2407 for execution. Such a medium may take many forms, including but not limited to, non-volatile media and volatile media. Non-volatile media includes, for example, optical or magnetic disks, such as disk drive 2410. Volatile media includes dynamic memory, such as system memory 2408.

In an embodiment of the invention, execution of the sequences of instructions to practice the invention is performed by a single computer system 2400. According to other embodiments of the invention, two or more computer systems 2400 coupled by communication link 2415 (e.g., LAN, PTSN, or wireless network) may perform the sequence of instructions required to practice the invention in coordination with one another.

Computer system 2400 may transmit and receive messages, data, and instructions, including program, i.e., application code, through communication link 2415 and communication interface 2414. Received program code may be executed by processor 2407 as it is received, and/or stored in disk drive 2410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
    generating a topic vector representing semantic significance of one or more terms, wherein generating the topic vector comprises:

performing a search on a sample corpus to obtain a plurality of samples;
accessing a sematic space to determine a plurality of semantic vectors based at least in part on the plurality of samples,
presenting a user interface comprising a plurality of themes based at least in part on the plurality of semantic vectors,
receiving a user selection, via the user interface, of one or more themes from the plurality of themes, and
saving the topic vector based at least in part on the user selection of one or more themes;
associating a set of alert rules with the topic vector, wherein the set of alert rules define one or more thresholds that trigger one or more alerts;
categorizing a set of messages based at least in part on analysis of the set of messages against the topic vector, to obtain a categorized set of messages;
determining whether the categorized set of messages satisfies the one or more thresholds defined in the set of alert rules; and
if the one or more thresholds are satisfied, generating a corresponding alert of the one or more alerts.

2. The method of claim 1, wherein the corresponding alert comprises at least one of an email message, a text message, a social media message, an audio communication, and a video communication.

3. The method of claim 1, further comprising performing an automatic processing task in response to the corresponding alert.

4. The method of claim 1, further comprising accessing a rules database to retrieve the set of alert rules, the rules database comprising rules for a plurality of topics.

5. The method of claim 1, wherein categorizing the set of messages comprises vectorizing the set of messages using a collection of vector values for a plurality of dimensions for a plurality of terms.

6. The method of claim 1, wherein at least one alert rule of the set of alert rules corresponds to a sentiment associated with the categorized set of messages.

7. The method of claim 1, wherein at least one alert rule of the set of alert rules corresponds to a volume of the categorized set of messages.

8. The method of claim 1, wherein at least one alert rule of the set of alert rules corresponds to a change in a volume of the categorized set of messages.

9. The method of claim 1, wherein the analysis of the set of messages against the topic vector comprises, for each particular message in the set of messages:
vectorizing the particular message to obtain a vectorized message; and
comparing the vectorized message to the topic vector to determine a similarity, if any, between the topic vector and the vectorized message.

10. A computer program product embodied in a non-transitory computer readable medium, the computer readable medium having stored thereon a sequence of instructions which, when executed by a processor causes the processor to execute a method comprising:
generating a topic vector representing semantic significance of one or more terms, wherein generating the topic vector comprises:
performing a search on a sample corpus to obtain a plurality of samples;
accessing a sematic space to determine a plurality of semantic vectors based at least in part on the plurality of samples,
presenting a user interface comprising a plurality of themes based at least in part on the plurality of semantic vectors,
receiving a user selection, via the user interface, of one or more themes from the plurality of themes, and
saving the topic vector based at least in part on the user selection of one or more themes;
associating a set of alert rules with the topic vector, wherein the set of alert rules define one or more thresholds that trigger one or more alerts;
categorizing a set of messages based at least in part on analysis of the set of messages against the topic vector, to obtain a categorized set of messages;
determining if the categorized set of messages satisfies the one or more thresholds defined in the set of alert rules; and
if the one or more thresholds are satisfied, generating a corresponding alert of the one or more alerts.

11. The computer program product of claim 10, wherein the corresponding alert comprises at least one of an email message, a text message, a social media message, an audio communication, and a video communication.

12. The computer program product of claim 10, further comprising performing an automatic processing task in response to the corresponding alert.

13. The computer program product of claim 10, further comprising accessing a rules database to retrieve the set of alert rules, the rules database comprising rules for a plurality of topics.

14. The computer program product of claim 10, wherein categorizing the set of messages comprises vectorizing the set of messages using a collection of vector values for a plurality of dimensions for a plurality of terms.

15. The computer program product of claim 10, wherein at least one alert rule of the set of alert rules corresponds to a sentiment associated with the categorized set of messages.

16. The computer program product of claim 10, wherein at least one alert rule of the set of alert rules corresponds to a volume of the categorized set of messages.

17. The computer program product of claim 10, wherein at least one alert rule of the set of alert rules corresponds to a change in a volume of the categorized set of messages.

18. The computer program product of claim 10, wherein the analysis of the set of messages against the topic vector comprises, for each particular message in the set of messages:
vectorizing the particular message to obtain a vectorized message; and
comparing the vectorized message to the topic vector to determine a similarity, if any, between the topic vector and the vectorized message.

19. A computer system comprising:
a computer processor to execute a set of program code instructions;
a memory to hold the program code instructions, in which the program code instructions comprises program code to perform operations comprising:
generating a topic vector representing semantic significance of one or more terms, wherein generating the topic vector comprises:
performing a search on a sample corpus to obtain a plurality of samples;
accessing a sematic space to determine a plurality of semantic vectors based at least in part on the plurality of samples, presenting a user interface comprising a plurality of themes based at least in part on the plurality of semantic vectors, receiving a user selection, via the user interface, of one or more themes from the plurality of themes, and saving the topic vector based at least in part on the user selection of one or more themes;

associating a set of alert rules with the topic vector, wherein the set of alert rules define one or more thresholds that trigger one or more alerts;

categorizing a set of messages based at least in part on analysis of the set of messages against the topic vector, to obtain a categorized set of messages;

determining whether the categorized set of messages satisfies the one or more thresholds defined in the set of alert rules; and if the one or more thresholds are satisfied, to generate a corresponding alert of the one or more alerts.

20. The system of claim 19, wherein the corresponding alert comprises at least one of an email message, a text message, a social media message, an audio communication, and a video communication.

21. The system of claim 19, further comprising performing an automatic processing task in response to the corresponding alert.

22. The system of claim 19, further comprising accessing a rules database to retrieve the set of alert rules, the rules database comprising rules for a plurality of topics.

23. The system of claim 19, wherein categorizing the set of messages comprises vectorizing the set of messages using a collection of vector values for a plurality of dimensions for a plurality of terms.

24. The system of claim 19, wherein at least one alert rule of the set of alert rules corresponds to a sentiment associated with the categorized set of messages.

25. The system of claim 19, wherein at least one alert rule of the set of alert rules corresponds to a volume of the categorized set of messages.

26. The system of claim 19, wherein at least one alert rule of the set of alert rules corresponds to a change in a volume of the categorized set of messages.

* * * * *

UNITED STATES PATENT AND TRADEMARK OFFICE
CERTIFICATE OF CORRECTION

PATENT NO. : 10,073,837 B2
APPLICATION NO. : 14/815714
DATED : September 11, 2018
INVENTOR(S) : Setayesh et al.

It is certified that error appears in the above-identified patent and that said Letters Patent is hereby corrected as shown below:

In the Specification

In Column 3, Line 5, after "invention" insert -- . --.

In Column 13, Lines 38-39, delete "messaes" and insert -- messages --, therefor.

In Column 16, Line 13, delete "satisfied" and insert -- satisfied. --, therefor.

In Column 19, Line 49, delete "threhshold" and insert -- threshold --, therefor.

In Column 19, Line 52, delete "embodment," and insert -- embodiment, --, therefor.

In Column 19, Line 55, delete "negatve" and insert -- negative --, therefor.

In Column 25, Line 59, delete "emaiUtext" and insert -- email/text --, therefor.

In Column 27, Line 65, delete "sematic" and insert -- semantic --, therefor.

In the Claims

In Column 29, Line 3, in Claim 1, delete "sematic" and insert -- semantic --, therefor.

In Column 29, Line 65, in Claim 10, delete "sematic" and insert -- semantic --, therefor.

In Column 30, Line 65, in Claim 19, delete "sematic" and insert -- semantic --, therefor.

Signed and Sealed this
Thirtieth Day of July, 2019

Andrei Iancu
*Director of the United States Patent and Trademark Office*

UNITED STATES PATENT AND TRADEMARK OFFICE
CERTIFICATE OF CORRECTION

PATENT NO. : 10,073,837 B2
APPLICATION NO. : 14/815714
DATED : September 11, 2018
INVENTOR(S) : Setayesh et al.

It is certified that error appears in the above-identified patent and that said Letters Patent is hereby corrected as shown below:

On the Title Page

Item (72), Lines 5-6, delete "Telengana (IN);" and insert -- Telangana (IN); --, therefor.

Item (72), Line 6, delete "Telengana (IN)" and insert -- Telangana (IN) --, therefor.

Signed and Sealed this
Seventh Day of July, 2020

Andrei Iancu
*Director of the United States Patent and Trademark Office*